US011385775B2

(12) United States Patent
Singh et al.

(10) Patent No.: US 11,385,775 B2
(45) Date of Patent: Jul. 12, 2022

(54) INTELLIGENT MONITOR AND LAYOUT MANAGEMENT

(71) Applicant: CITRIX SYSTEMS, INC., Fort Lauderdale, FL (US)

(72) Inventors: Manbinder Pal Singh, Fort Lauderdale, FL (US); Georgy Momchilov, Parkland, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/862,719

(22) Filed: Apr. 30, 2020

(65) Prior Publication Data
US 2021/0342042 A1 Nov. 4, 2021

(51) Int. Cl.
G06F 3/048 (2013.01)
G06F 3/0484 (2022.01)
H04L 67/30 (2022.01)

(52) U.S. Cl.
CPC ............ G06F 3/0484 (2013.01); H04L 67/30 (2013.01)

(58) Field of Classification Search
CPC ..... G06F 3/0484; H04L 67/30; H04L 67/303; H04L 67/306
See application file for complete search history.

(56) References Cited

U.S. PATENT DOCUMENTS

| | | | | |
|---|---|---|---|---|
| 10,649,627 B2* | 5/2020 | Ko | ........................... | G06F 3/048 |
| 2002/0196279 A1* | 12/2002 | Bloomfield | ............ | G06F 9/542 |
| | | | | 715/749 |
| 2003/0063119 A1* | 4/2003 | Bloomfield | ............. | G06F 9/452 |
| | | | | 707/E17.116 |
| 2010/0122207 A1* | 5/2010 | Kim | ........................ | H04N 7/163 |
| | | | | 715/788 |
| 2011/0037711 A1* | 2/2011 | Siddiqui | ................ | G06F 3/1423 |
| | | | | 345/3.1 |
| 2011/0113363 A1* | 5/2011 | Hunt | ..................... | G06F 3/0484 |
| | | | | 715/800 |
| 2013/0038636 A1* | 2/2013 | Fujiwaka | ............. | G06F 3/04883 |
| | | | | 345/619 |
| 2013/0278484 A1* | 10/2013 | Hwang | ................. | G06F 3/1423 |
| | | | | 345/2.3 |
| 2013/0332885 A1* | 12/2013 | Ji | ......................... | G06F 3/04847 |
| | | | | 715/833 |
| 2014/0047379 A1* | 2/2014 | Urawaki | ............... | G06F 3/1423 |
| | | | | 715/789 |

(Continued)

*Primary Examiner* — Linh K Pham

(74) *Attorney, Agent, or Firm* — Allen, Dyer, Doppelt + Gilchrist, PA

(57) ABSTRACT

A computer system includes a client device to remotely access a virtual desktop. The client device is configured to launch application windows on at least one display based on default launch positions, and monitor usage of applications within the application windows to identify user patterns on how the applications are used in various layouts on the at least one display. The various layouts correspond to preferred positions. Usage of the applications within the application windows is mapped, with the mapping including associating the preferred positions to the corresponding default launch positions. At least one of the application windows is repositioned to the preferred position associated therewith based on the mapping in response to the at least one application window not being in the preferred position.

28 Claims, 26 Drawing Sheets

(56) References Cited

U.S. PATENT DOCUMENTS

| | | | |
|---|---|---|---|
| 2014/0053097 A1* | 2/2014 | Shin | G06F 3/04886 |
| | | | 715/779 |
| 2016/0212103 A1* | 7/2016 | Rhoads | H04L 63/0869 |
| 2018/0011592 A1* | 1/2018 | Chen | G06F 3/04883 |
| 2018/0095772 A1* | 4/2018 | Wu | H04W 88/02 |
| 2018/0188910 A1* | 7/2018 | Ko | G06F 1/1616 |
| 2018/0329508 A1* | 11/2018 | Klein | G06F 1/1641 |
| 2019/0279407 A1* | 9/2019 | McHugh | G06T 11/60 |
| 2020/0326839 A1* | 10/2020 | Walkin | G06F 3/0482 |
| 2021/0096885 A1* | 4/2021 | Klein | G06F 3/1423 |
| 2021/0096887 A1* | 4/2021 | Klein | G06F 9/44505 |

* cited by examiner

INTELLIGENT MONITOR AND LAYOUT MANAGEMENT

TECHNICAL FIELD

The present disclosure relates to computer systems, and more particularly, to a computer system with intelligent monitor and layout management for multi-monitor and large monitor environments.

BACKGROUND

A multi-monitor environment is the use of multiple physical display devices, such as monitors, in order to increase the area available for programs and applications running on a single computer system. As an alternative to multiple physical display devices, a single large monitor may be used where the monitor is split into multiple virtual monitors.

Multi-monitor and single large monitor environments are common in financial and brokerage firms, for example. Speed is important in trading, and a trader does not want to waste time toggling between windows on a single monitor. In addition, the trader may be constantly multi-tasking to help assess risks and make quick decisions.

Typically, a trader may use six or more monitors at the same time. One monitor may be for monitoring stocks, and another monitor may be used to monitor market news and major headlines coming in through a news/finance information service. Beyond just watching the news, another monitor may be used to track stocks the trader is interested in and to see their prices updated in real-time. Another one or two monitors may be used by the trader to actually make trades. Another monitor may be used to display programs used to make calculations, such as for valuing bonds, analyzing yield curves, or back-testing a trading strategy. To handle emails and to see incoming messages, yet another monitor may be used.

Multi-monitors and a single large monitor split into multiple virtual monitors provide a user with additional display areas to more effectively manage their tasks. However, current multi-monitor and layout management support has limitations. The trader in the above example may spend about 15-20 minutes every day managing the monitor/layout while using various applications and programs. On a daily basis, the trader typically has to position application windows on preferred monitors when the computer system is turned on, as well as moving objects (i.e., drag and drop) between different application windows, and manually resizing application windows many times throughout the day.

SUMMARY

A computer system includes a client device to remotely access a virtual desktop. The client device is configured to launch application windows on at least one display based on default launch positions, and monitor usage of applications within the application windows to identify user patterns on how the applications are used in various layouts on the at least one display. The various layouts correspond to preferred positions. Usage of the applications within the application windows is mapped, with the mapping including associating the preferred positions to the corresponding default launch positions. At least one of the application windows is repositioned to the preferred position associated therewith based on the mapping in response to the at least one application window not being in the preferred position.

The client device may be further configured to update the default launch positions to the preferred positions, and if the default launch position for one of the application windows is not updated to the preferred position, then a next time the application window is launched the preferred position will be used.

The client device may be further configured to generate a recommendation notification on the at least one display before repositioning the application window to the preferred position associated therewith, with the recommendation notification notifying the user that a recommended position for the application window is available.

The client device may be further configured to generate a transparent overlay on the at least one display representing where the application window is to be repositioned in response to the user selecting the recommendation notification. The client device may be further configured to reposition the application window in the preferred position in response to the user accepting the recommendation.

The at least one display may include a single monitor configured to display the plurality of application windows. Alternatively, the at least one display may include a plurality of monitors, with each monitor having at least one application window displayed thereon.

At least one of the application windows may have more than one preferred position associated therewith within a same session based on usage of the application within the at least one application window.

The client device may be further configured to monitor content of different documents opened within the application, with the different documents being used in different layouts on the at least one display based on the content associated with each respective document, and with each layout corresponding to a preferred position.

The client device may be further configured to monitor context of different documents opened within the application, with the different documents being used in different layouts on the at least one display based on the context associated with each respective document, and with each layout corresponding to a preferred position.

Identifying user patterns may further include determining applications that are used together where a user switches back and forth between the applications, and if the application windows associated with the applications that are used together are spaced apart so that they are not side-by-side, then the client device may be further configured to reposition at least one of the application windows so that the applications windows are side-by-side.

The client device may be further configured launch at least one browser window on the at least one display, with the at least one browser window including a plurality of open web pages based on default launch positions. Usage of the open web pages within the at least one browser window is monitored to identify user patterns on how the open web pages are used in various layouts on the at least one display. The various layouts may correspond to preferred positions. Usage of the open web pages within the at least one browser window is mapped, with the mapping including associating the preferred positions to the corresponding default launch positions. At least one of the open web pages is repositioned to the preferred position associated therewith based on the mapping in response to the at least one open web page not being in the preferred position.

The mapping may further include associating respective web addresses to the preferred positions of the open web pages, with each respective web address having a categorization associated therewith.

Monitoring usage of the applications within the application windows may include determining user interaction times with the respective applications. The client device may be further configured to prioritize repositioning of the application windows on the at least one display based on the user interaction times.

The client device may be further configured to monitor how the application windows are currently positioned on the at least one display, cast the at least one display to an external display, and monitor and map how the application windows are repositioned on the external display during the casting. The client device is further configured to switch back to how the application windows were currently positioned on the at least one display in response to the casting being stopped, and a next time the at least one display is cast to the external display, the application windows are repositioned based on the mapping performed during the casting.

The client device may be associated with a first workstation, and in response to the user of the client device roaming to a second workstation with a different display setup, the following steps are performed. The steps include monitoring how the application windows are currently positioned on the at least one display for the first workstation, monitoring and mapping how the application windows are repositioned on the different display setup during the roaming to the second workstation. The steps further include switching back to how the application windows were currently positioned on the at least one display in response to the user roaming back to the first workstation, and a next time the user roams back to the second workstation, reposition the application windows based on the mapping performed during the roaming to the second workstation.

At least one of the application windows may have a first size when not being actively used, and a second window size when being actively used, with the second window size being larger than the first window size. Alternatively, the second window size may be smaller than the first window size.

The client device may be further configured to monitor activity of the at least one application window, and adjust the at least one application window between the first and second window sizes based on the monitored activity.

At least one application window may be adjacent at least one other application window on the at least one display, and wherein the client device may be further configured to adjust a size of the at least one other application window to accommodate the first and second sizes of the at least one application window.

The at least one display may include a plurality of physical monitors, with each physical monitor having at least one application window displayed thereon. The client device may be further configured to monitor at least one of content and context of a document opened within one of the applications, with the document requiring a larger display area based on at least one of predetermined content and predetermined context. The client device may be further configured to create a virtual monitor to include at least two of the physical monitors to provide the larger display area for the document being monitored.

Another aspect is directed to a method that include remotely accessing a virtual desktop, and launching a plurality of application windows on at least one display based on default launch positions. Usage of applications within the application windows is monitored to identify user patterns on how the applications are used in various layouts on the at least one display, with the various layouts corresponding to preferred positions. Usage of the applications within the application windows is mapped, with the mapping including associating the preferred positions to the corresponding default launch positions. At least one of the application windows is repositioned to the preferred position associated therewith based on the mapping in response to the at least one application window not being in the preferred position.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
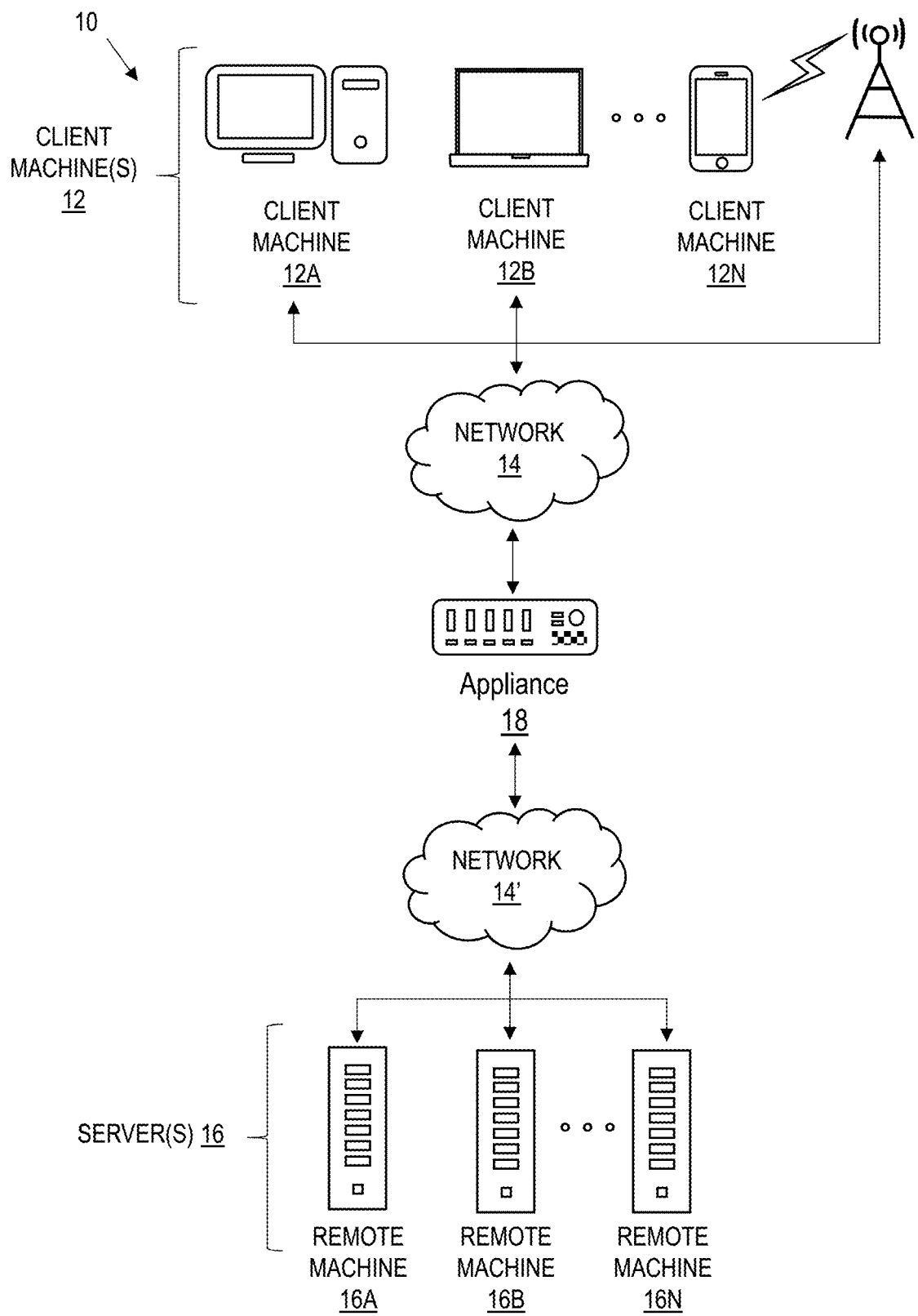
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
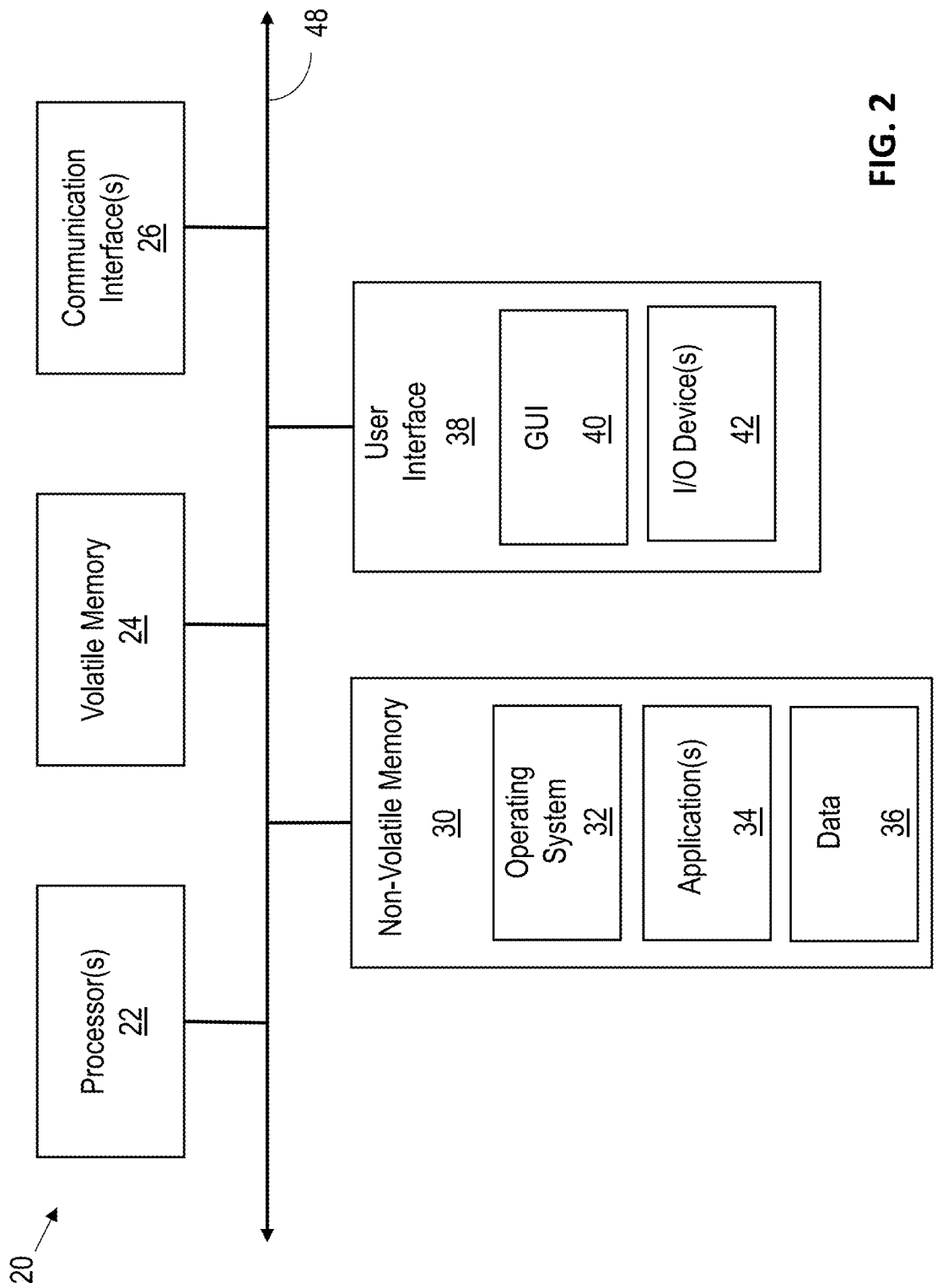
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
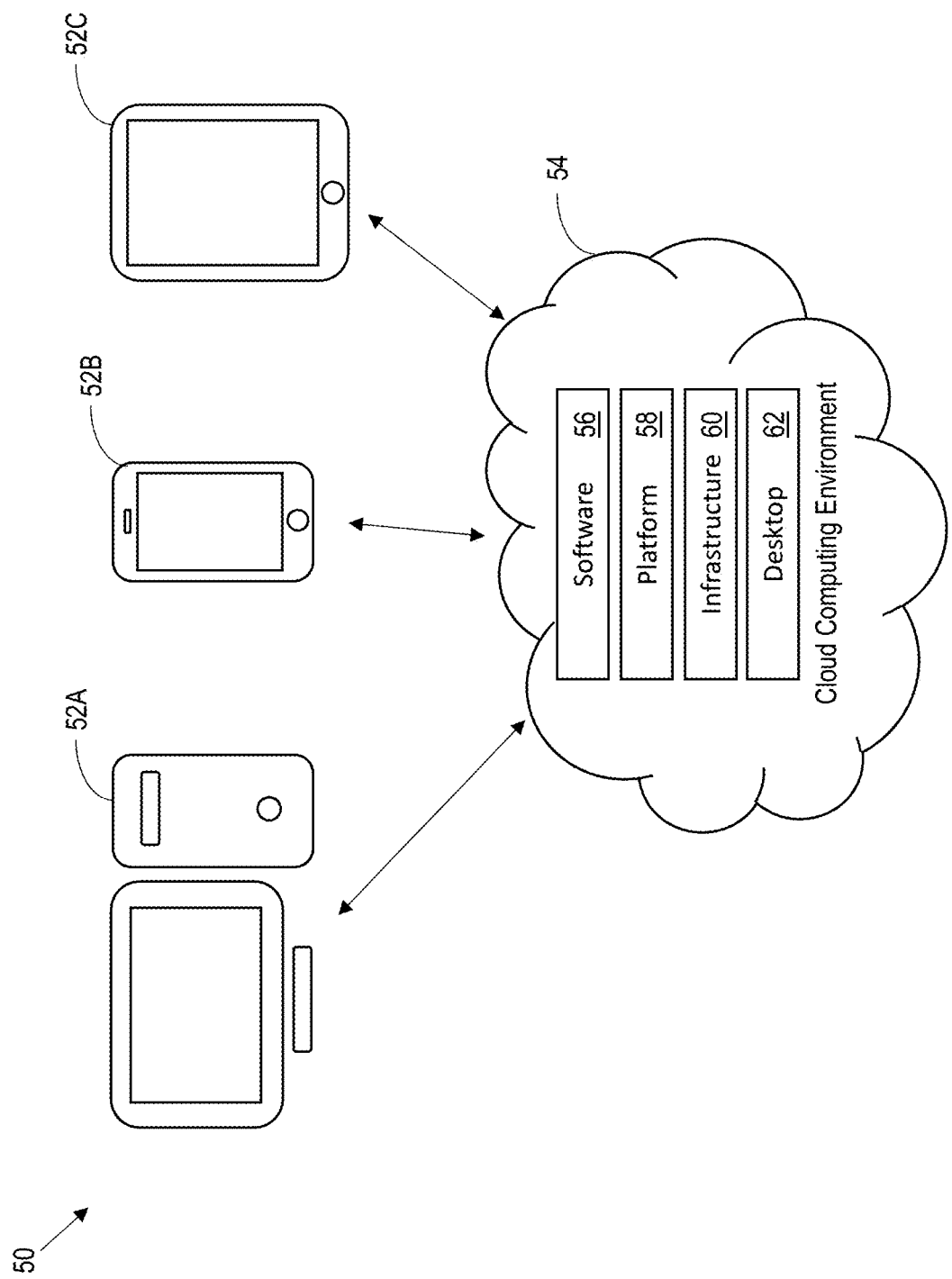
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
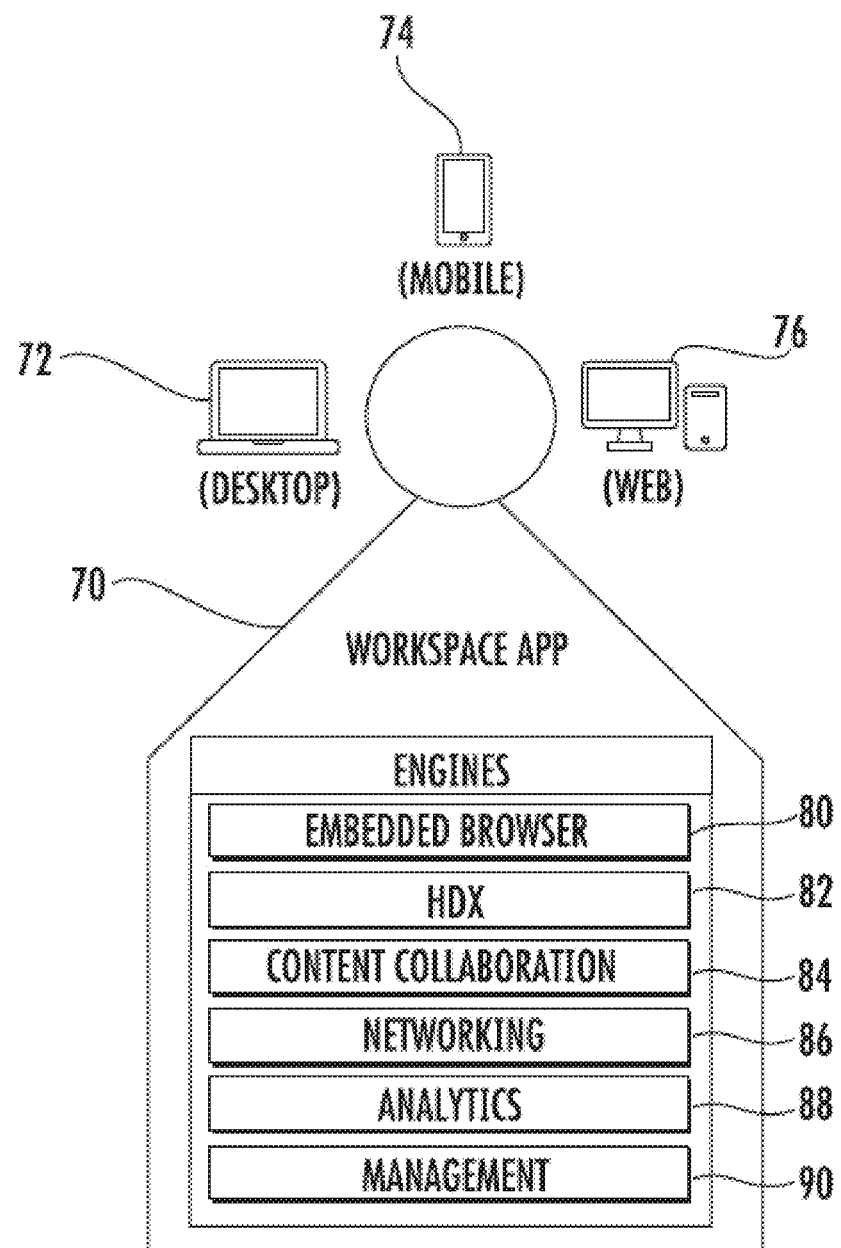
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
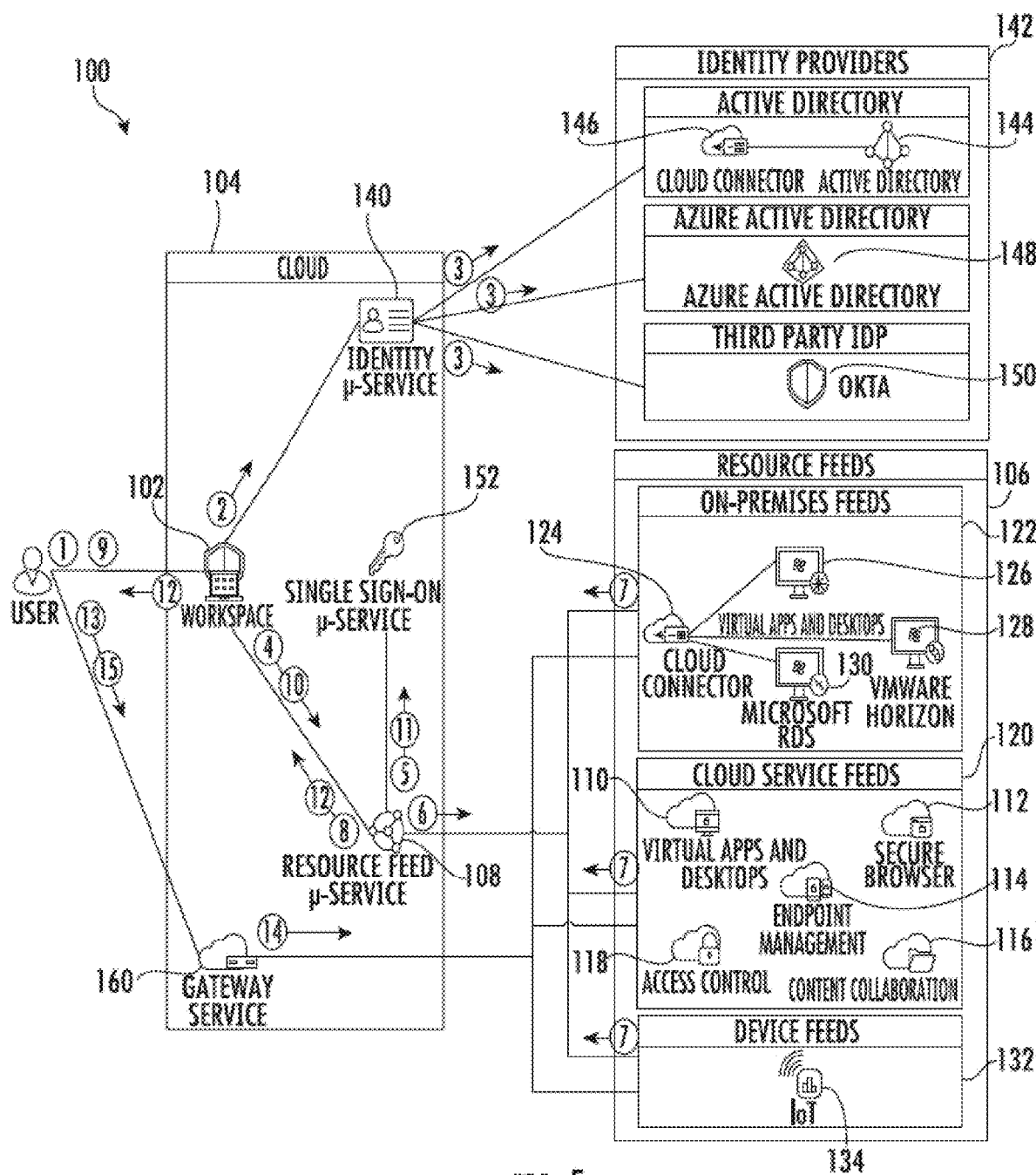
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds 16 via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
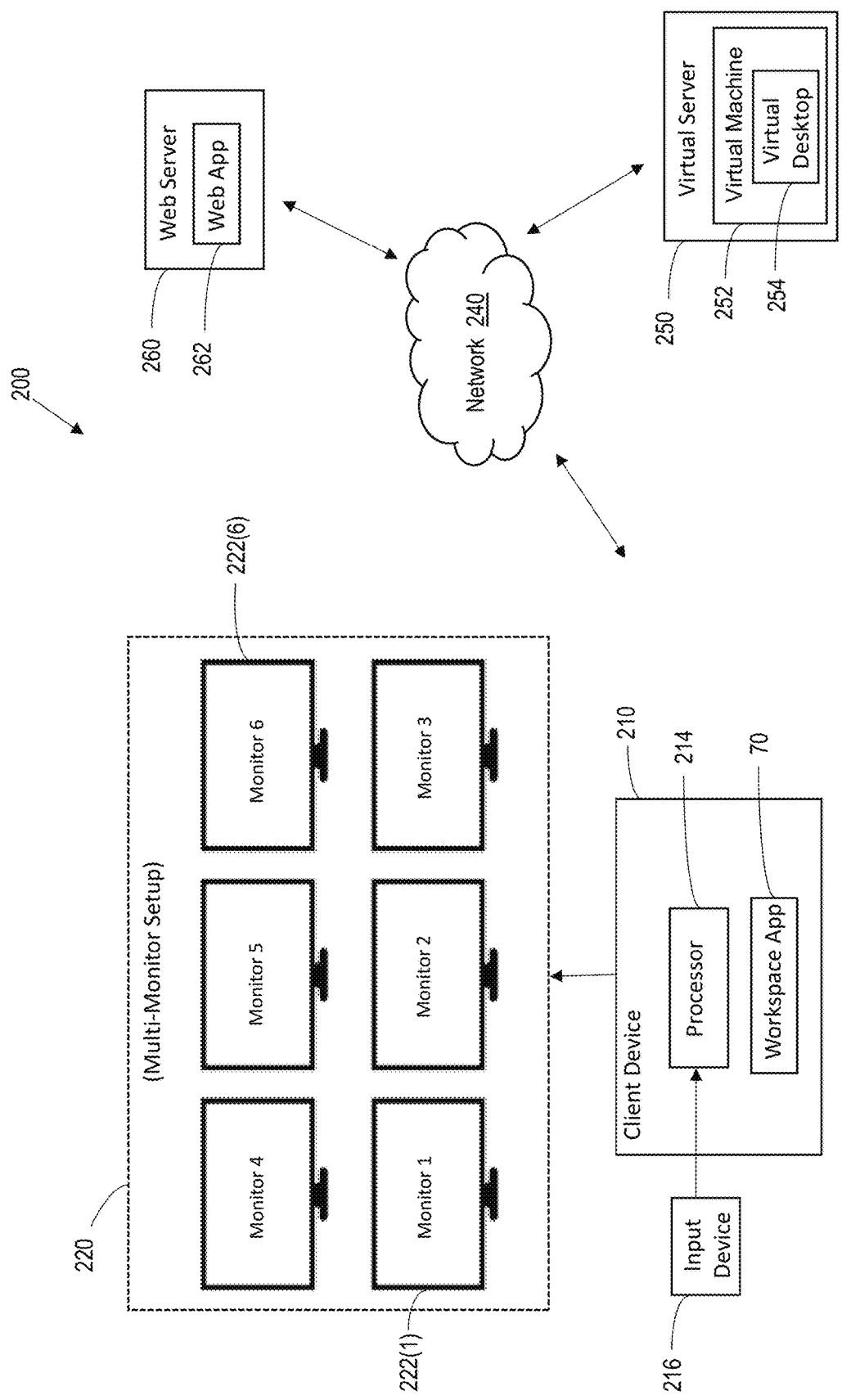
FIG. 6 is a schematic block diagram of a computer system supporting a drag and drop function for a client device in a multi-monitor environment in which various aspects of the disclosure may be implemented.
Figure 7:
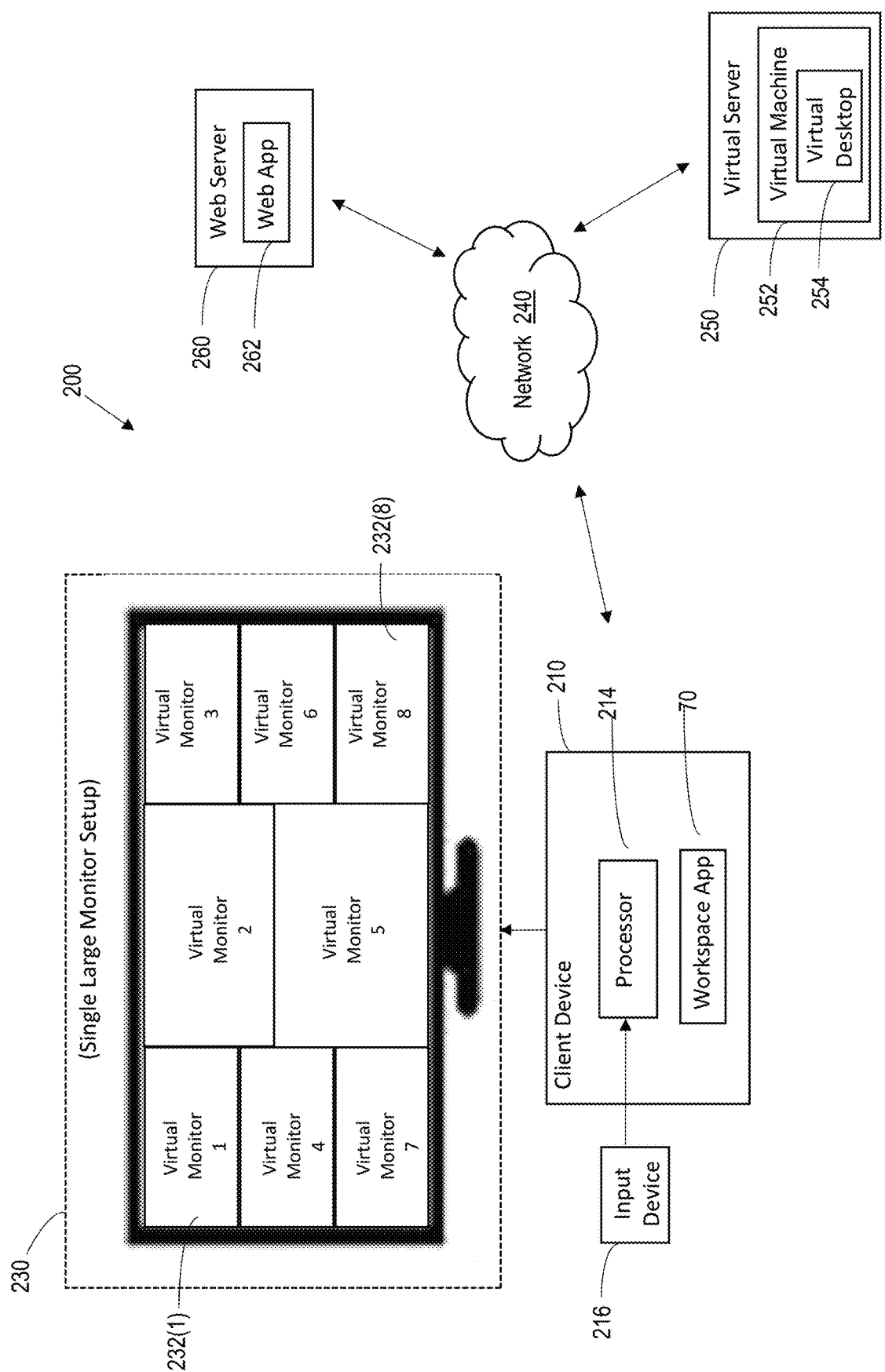
FIG. 7 is a schematic block diagram of the computer system illustrated in FIG. 6 with the client device in a single large monitor environment.

Referring initially to FIGS. 6 and 7, a computer system 200 supporting a quick drag and drop functionality will be discussed. The illustrated computer system 200 includes a client device 210 configured to remotely access a virtual server 250 via a communications network 240 for a virtual desktop 254. The client device 210 may also access a web server 260 via the communications network 240 for a web application 262. The web application 262 may be a SaaS application, for example. The client device 210 may be a smartphone, a tablet computer, a laptop computer, or a desktop computer, for example.

In one embodiment (FIG. 6), the client device 210 is configured with a multi-monitor setup 220. In another embodiment (FIG. 7), the client device 200 is configured with a single large monitor setup 230. Although not illustrated, the client device may be configured with at least one of an augmented reality (AR) display and a virtual reality (VR) display.

In graphical user interfaces (GUIs), drag and drop is a pointing device gesture in which a user selects an object and drags that object to a different location. The location of the object to be dragged may be referred to as a drag source, and the location of where the object is to be dropped may be referred to as a drop target.

For the client device 210 with the multi-monitor setup 220, a plurality of monitors 222(1)-222(6) are coupled to a processor 214 within the client device 210. Even though 6 monitors are shown, this is not to be limiting. The actual number will vary depending on the user's operating environment. An input device 216 is coupled to the processor 214 to control the drag and drop functionality. The processor 214 interfaces with the workspace app 70 as discussed above. The workspace app 70 keeps track of the various windows available within the multi-monitor setup 220, as well as detecting when a user initiates the drag and drop function. The workspace app 70 also keeps track of the content within each of the windows.

The selected object may be an icon, a folder, a file, a document, an application window and the window itself, for example. In the multi-monitor setup 220, for example, an object within a window on one of the monitors may be dragged to a window on a different monitor. Also, an object within a window on one of the monitors may be dragged to a different window on the same monitor.

For the client device 210 with the single large monitor setup 230, a single monitor 232 is coupled to the processor 214. The single monitor 232 is split into multiple virtual monitors 232(1)-232(8). An example size of the single monitor 232 may be within a range of 43 to 98 inches, for example. Even though 8 virtual monitors are shown, this is not to be limiting. The actual number will vary depending on the user's operating environment.

As in the multi-monitor setup 220, the selected object may be an icon, a folder, a file, a document, an application window and the window itself, for example. In the single large monitor setup 230, for example, an object within a window on one of the virtual monitors may be dragged to a window on a different virtual monitor. Also, an object within a window on one of the virtual monitors may be dragged to a different window on the same virtual monitor. Mixed environments are also possible where some monitors are a large monitor having virtual monitors within, and some monitors are small monitors. For example, an object within a window on one virtual monitor can be dragged to a different window on a different physical monitor.

A problem with drag and drop in a multi-monitor setup 220 and in a single large monitor setup 230 is that this can be a time consuming process when the user has to rotate their head to change their line of sight to where the object is to be moved. Moreover, the user may have to drag the object across different monitors or virtual monitors to reach the desired drop target.

Typically, with drag and drop, an input device 216 is used to place a pointer on the object to be moved. The input device 216 may be configured as a mouse or touchpad, for example. Other types of pointing devices may be used as well. Currently, the drag and drop operation is based on the user pressing and holding down a button on the pointing device to grab the object. While the button on the pointing device is being held down, the grabbed object is dragged to the desired location (i.e., drop target) by moving the pointer to that location. This involves the user moving their head to the monitor or virtual monitor that is to receive the object while holding down the button on the pointing device. The object is then dropped by releasing the button on the pointing device.

As will be now be discussed in greater detail, user productivity when performing a drag and drop operation in a multi-monitor setup 220 or in a single large monitor setup 230 may be improved with the use of thumbnails. Thumbnails are miniature representations of the different windows that could receive the drag source. Thumbnails allow a user to perform a quick drag and drop operation without having to rotate their head to change their line of sight between the drag source and the drop target. In some cases or alternate implementations, the overlays could also be on the monitor/ display where the drop target is located. Some users may move their head more quickly than moving the mouse. So this means a user is already watching the window which has the dropped target. In this case making the overlay to show on the source window may require the user to again move their head to the monitor where the drag was originated and then again moving back to the monitor having the dropped target.

Virtual desktop infrastructure (VDI) supports running the virtual desktop 254 in a virtual machine 252 that is hosted on the virtual server 250. The virtual server 250 is in a data center, which may be provided by Microsoft Azure or Amazon Web Services, for example. The virtual desktop 254 includes an operating system, applications and data.

An example architecture for desktop virtualization is provided by Citrix Virtual Apps and Desktops (CVAD), from Citrix Systems, Inc. CVAD is an application virtualization platform that helps optimize productivity with universal access to virtual apps and server-based desktops from different client devices 210. CVAD carries all the same functionality as Citrix Virtual Apps, plus the option to implement a scalable virtual desktop infrastructure. Citrix Virtual Apps/CVAD are available as a cloud service or an on-premises configuration. Other suitable platforms for providing virtual desktops and virtual apps may be used in different embodiments.

Figure 8:
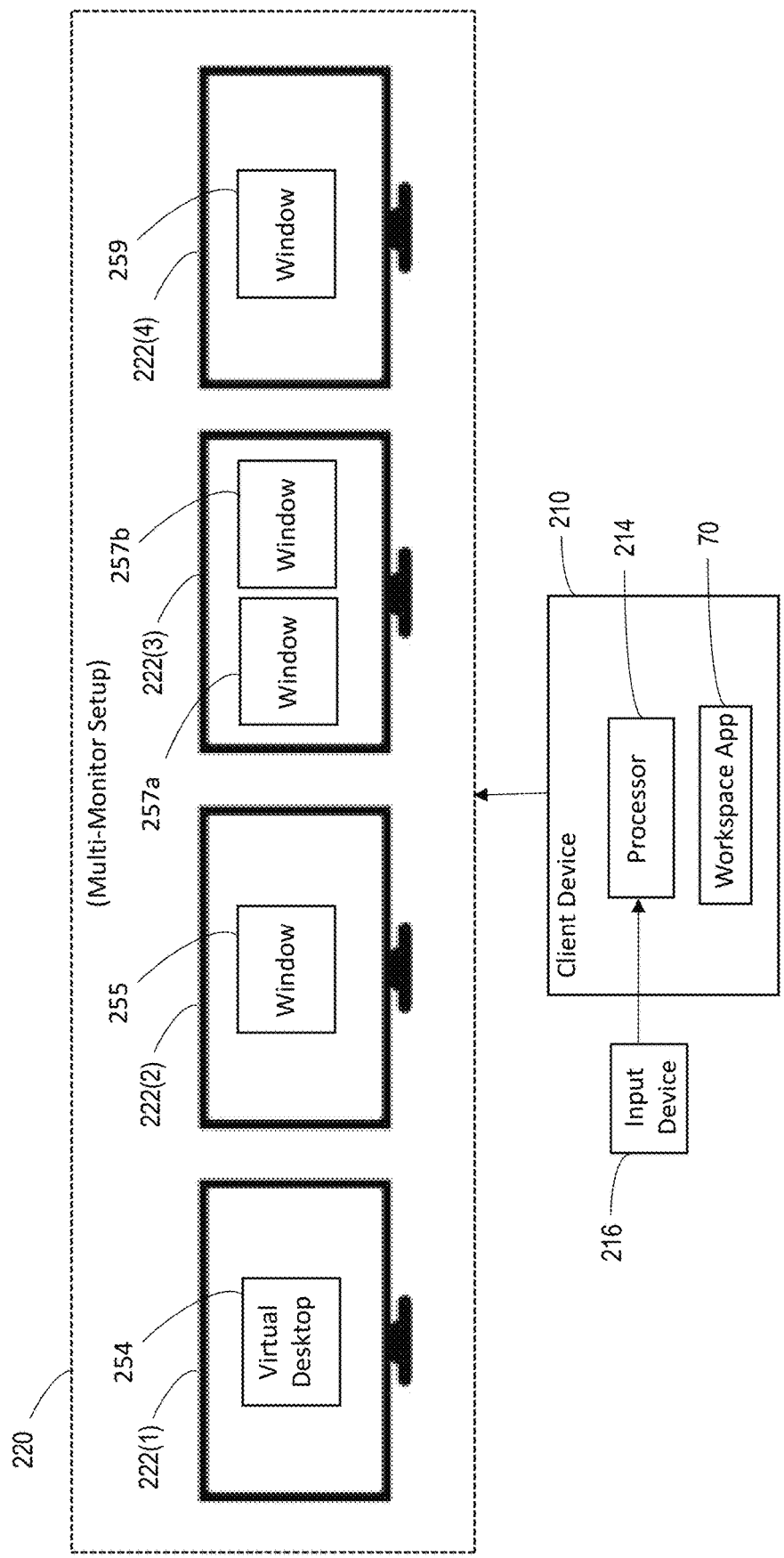
FIG. 8 is a schematic block diagram of the client device illustrated in FIG. 6 with four monitors supporting the use of thumbnails in a drag and drop operation.

Referring now to the client device in FIG. 8 and to the screenshots in FIGS. 9-14, an example drag and drop operation using thumbnails will be discussed. In this example, 4 monitors 222(1)-222(4) in a multi-monitor setup 220 are used. This example drag and drop operation is equally applicable to 4 virtual monitors 232(1)-232(4) in a single large monitor setup 230. Even though reference will be made to monitors 222(1)-222(4) in the illustrated drag and drop operation, these monitors are interchangeable with virtual monitors 232(1)-232(4).

The processor 214 in the client device 210 launches a plurality of windows on the different monitors 222(1)-222(4). Monitor 1 222(1) displays a virtual desktop 254 for the computer system 200. Monitor 2 222(2) provides a window 255, monitor 3 222(3) provides multiple windows 257a, 257b and monitor 4 222(4) provides a window 259. The windows in monitors 2-4 222(2)-222(4) may correspond to application windows, for example. In some cases, a monitor may have multiple application windows, as provided on monitor 3 222(3).

Figure 9:
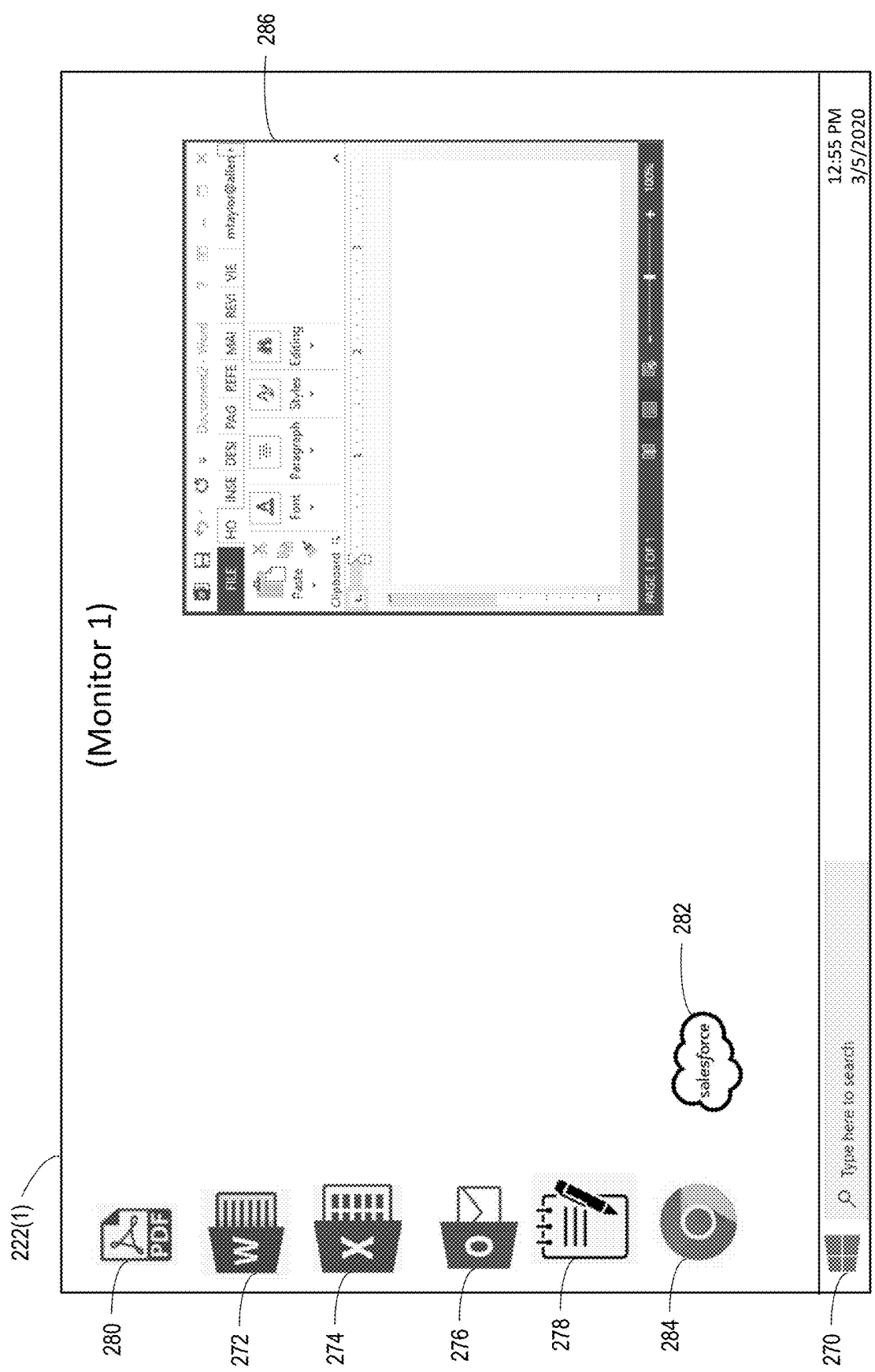
FIGS. 9-14 are screenshots illustrating the drag and drop function using the computer system illustrated in FIG. 8.
Figure 10:
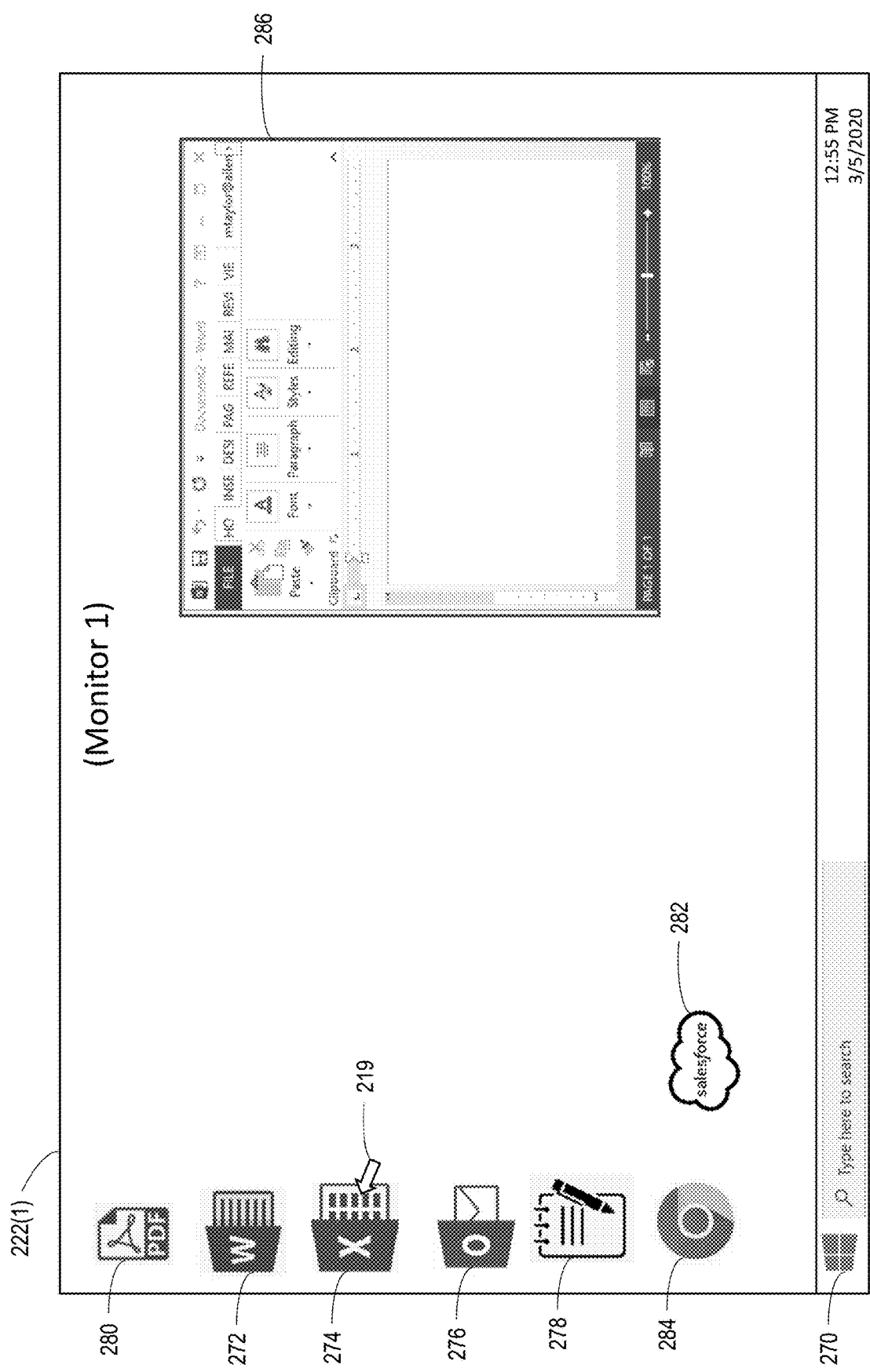

The virtual desktop 254 as illustrated by the screenshot in FIG. 9 provides an operating system and applications. The operating system may be a Microsoft Windows operating system, for example, as represented by the Windows start icon 270. The client device 210 also has access to a web browser, which may be a Google Chrome web browser, for example, as represented by the web browser icon 284. The web browser may be local to the client device 210, may be hosted on the virtual server 250, or embedded within the workspace app 70.

The illustrated applications include Microsoft products such as Word, Excel, Outlook and Notepad. Word is represented by a Word icon 272, Excel is represented by an Excel icon 274, Outlook is represented by an Outlook icon 276, and Notepad is represented by a Notepad icon 278. One of the Microsoft products, such as Word, may be selected so that a Word window 286 is opened on the virtual desktop 254.

The applications may further include Adobe Acrobat, which is represented by PDF icon 280. Adobe Acrobat is a portable document format (PDF) application used to present and exchange documents reliably. Another application available on the virtual desktop 254 is Salesforce, as represented by a Salesforce icon 282. Salesforce is a SaaS app that supports customer relationship management (CRM) activities.

In the example drag and drop operation, the user wants to drag the Excel icon 274 from monitor 1 222(1) to monitor 4 222(4). The user operates the input device 216 to place a pointer 219 on the Excel icon 274, as illustrated by the screenshot in FIG. 10

Figure 11:
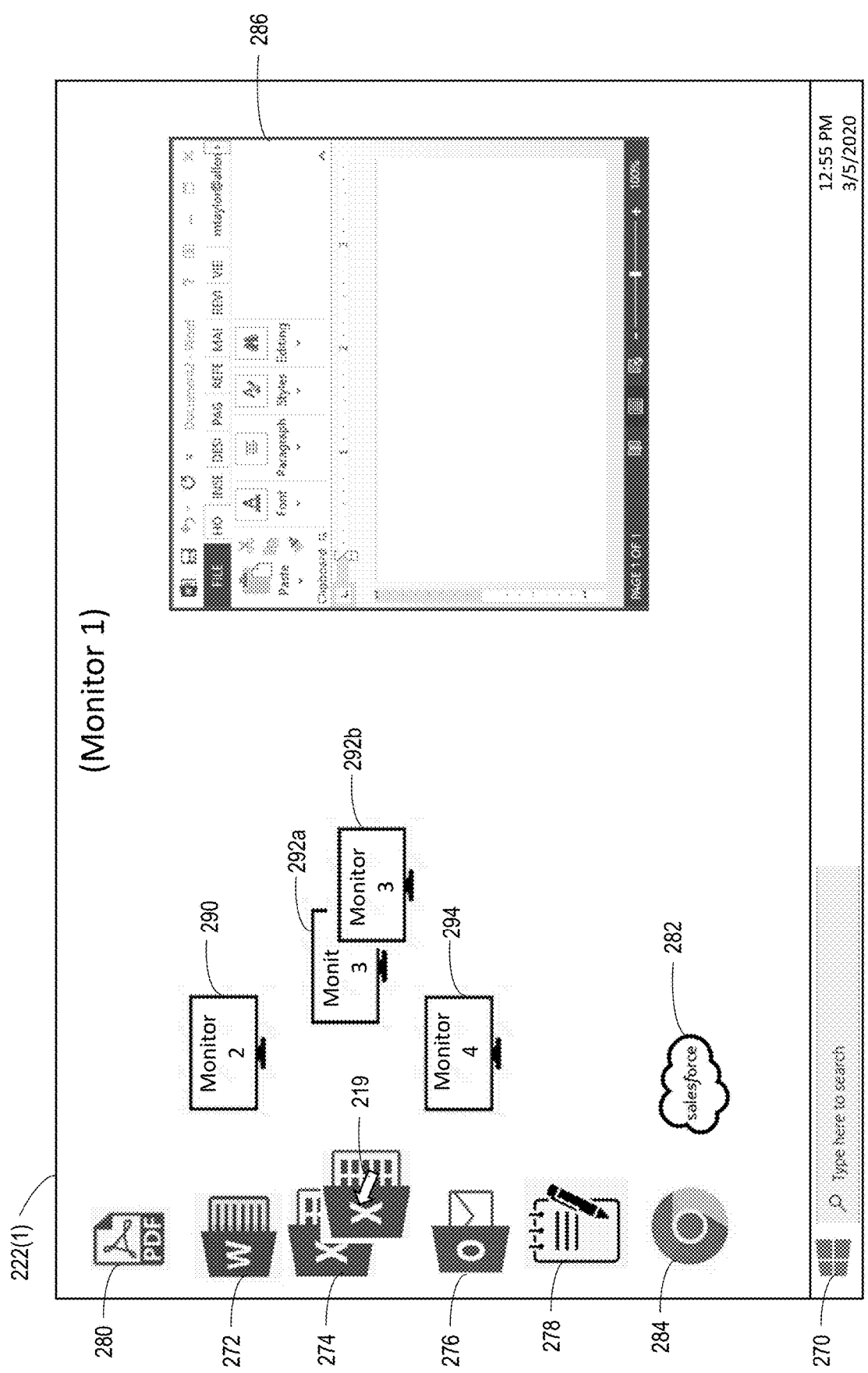
Figure 12:
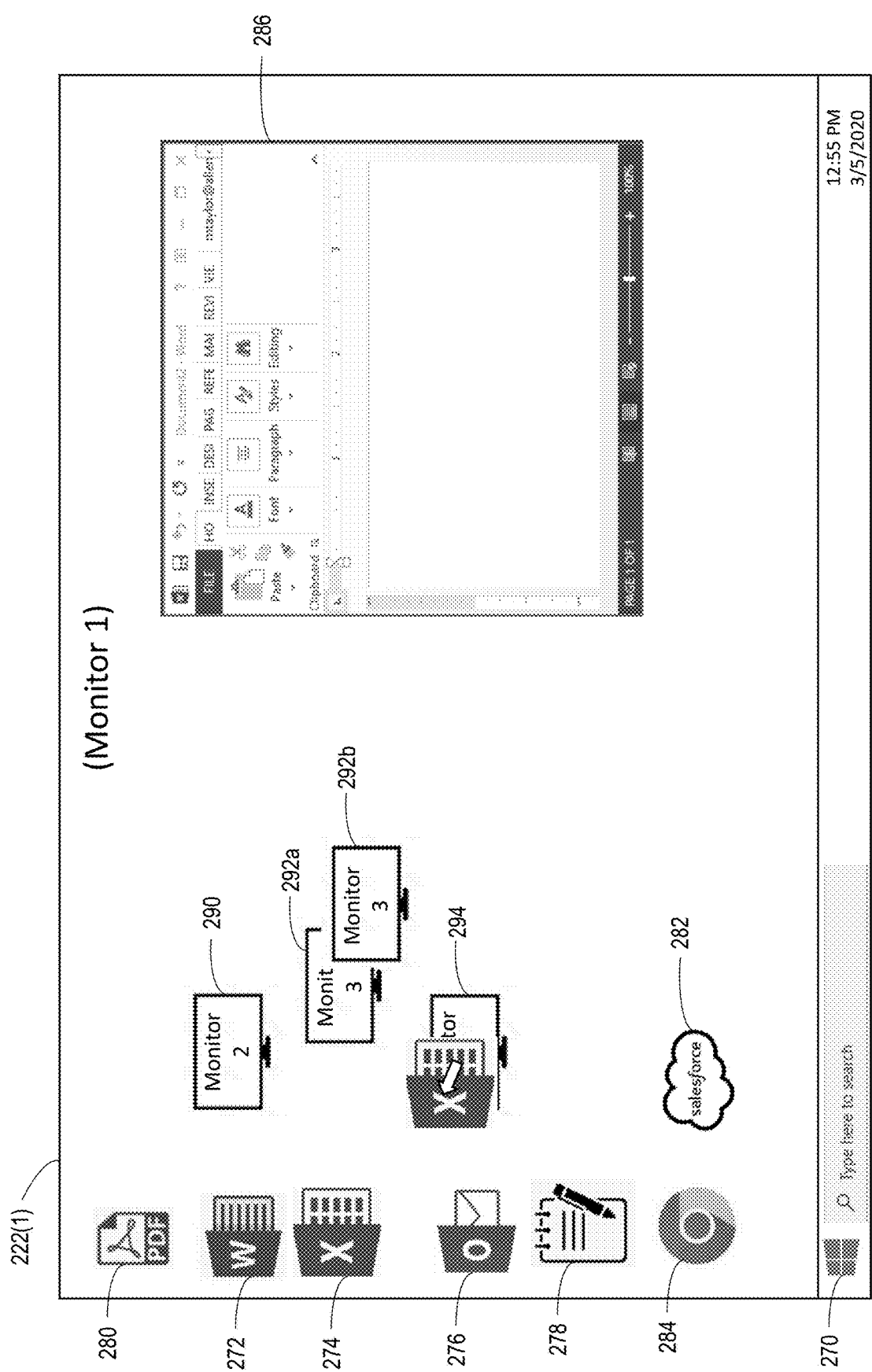

When the processor 214 in cooperation with the workspace app 70 detects dragging of the Excel icon 274, thumbnails 290, 292a, 292b, 294 are overlaid on monitor 1 222(1), as illustrated by the screenshot in FIG. 11. Each thumbnail 290, 292a, 292b, 294 represents a respective window from monitors 222(2)-222(4). Since monitor 3 222(3) has multiple application windows, multiple thumbnails 292a, 292b are overlaid on monitor 1 222(1), with each thumbnail representing one of the respective application windows.

The thumbnails 290, 292a, 292b, 294 are positioned in close proximity to the Excel icon 274 being dragged. This minimizes the distance the Excel icon 274 is to be dragged before being dropped. The dragged Excel icon 274 is then dropped on thumbnail 294, as illustrated by the screenshot in FIG. 12, where thumbnail 294 is associated with monitor 4 222(4).

Figure 13:
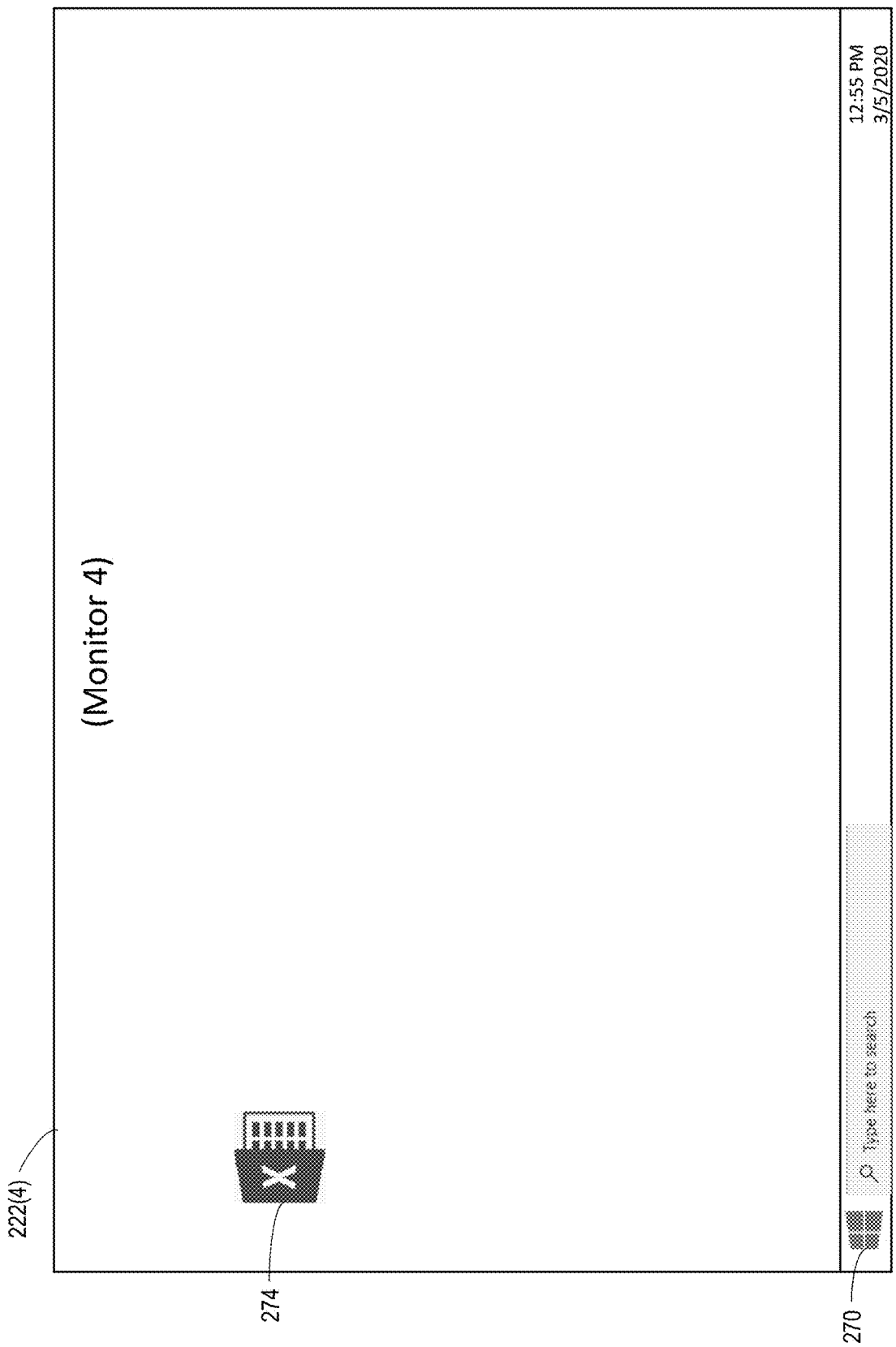
Figure 14:
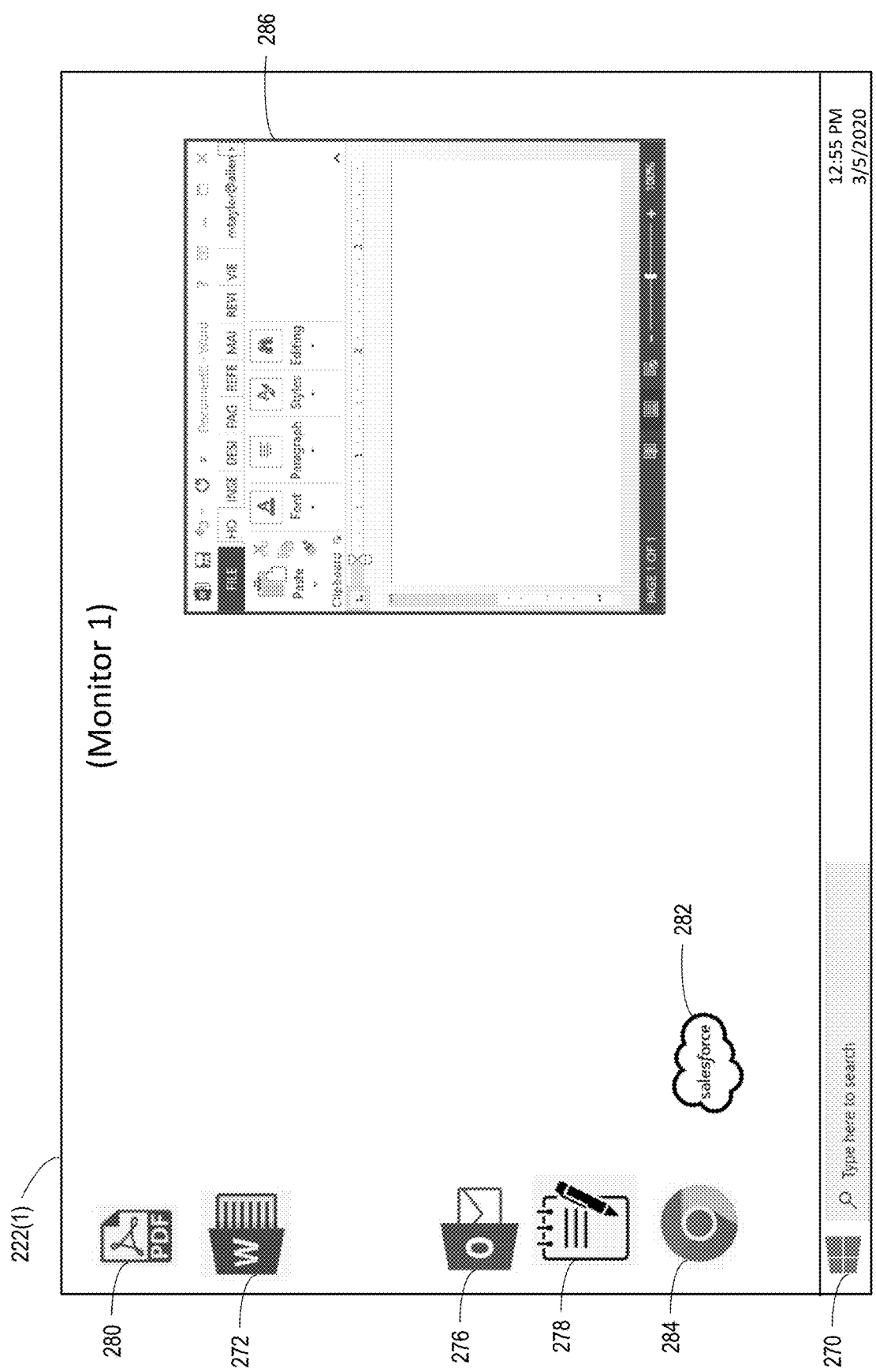

In response to the Excel icon 274 being dropped on thumbnail 294, the Excel icon 274 is provided by the processor 214 to monitor 4 222(4), as illustrated by the screenshot in FIG. 13. The Excel icon 274 and the actual object associated with the Excel icon 274 may be moved or copied to monitor 4 222(4). In this example, the Excel icon 274 corresponds to an Excel file with some data in it. The Excel file and data have file extensions associated therewith. As illustrated by the screenshot in FIG. 14, the thumbnails 290, 292a, 292b, 294 displayed in monitor 1 222(1) are removed by the processor 214 in response to the Excel icon 274 being moved to monitor 4 222(4). In addition, the Excel icon 274 is no longer displayed on monitor 1 222(1). In this example, the object associated with the Excel icon 274 is being moved to monitor 4 222(4). In other cases, the object associated with the Excel icon 274 may be copied to monitor 4 222(4). That is, a drag and drop can be a copy or a move operation. For example, on a Windows operating system, if while doing a drag operation a user presses the shift key on the keyboard, then it is a move operation. Alternatively, pressing the control key results in a copy operation. Default is typically a copy operation but it could be a move operation. The Excel icon 274 may be removed if it was a move drag and drop operation or the Excel icon 274 may remain if it was a copy operation.

The use of thumbnails 290, 292a, 292b, 294 advantageously improves user productivity since the user can perform a quick drag and drop operation while focusing on monitor 1 222(1) with the drag source. By dragging the Excel icon 274 to the thumbnail 294 displayed on monitor 1 222(1), the user does not have to rotate their head or change their line of sight to monitor 4 222(4) that is receiving the Excel icon 274.

Even though the above drag and drop operation involves an icon, other object types may be dragged and dropped, as readily appreciated by those skilled in the art. For example, other object types that may be dragged and dropped include files, folders, documents, application windows and even the window itself.

Figure 15:
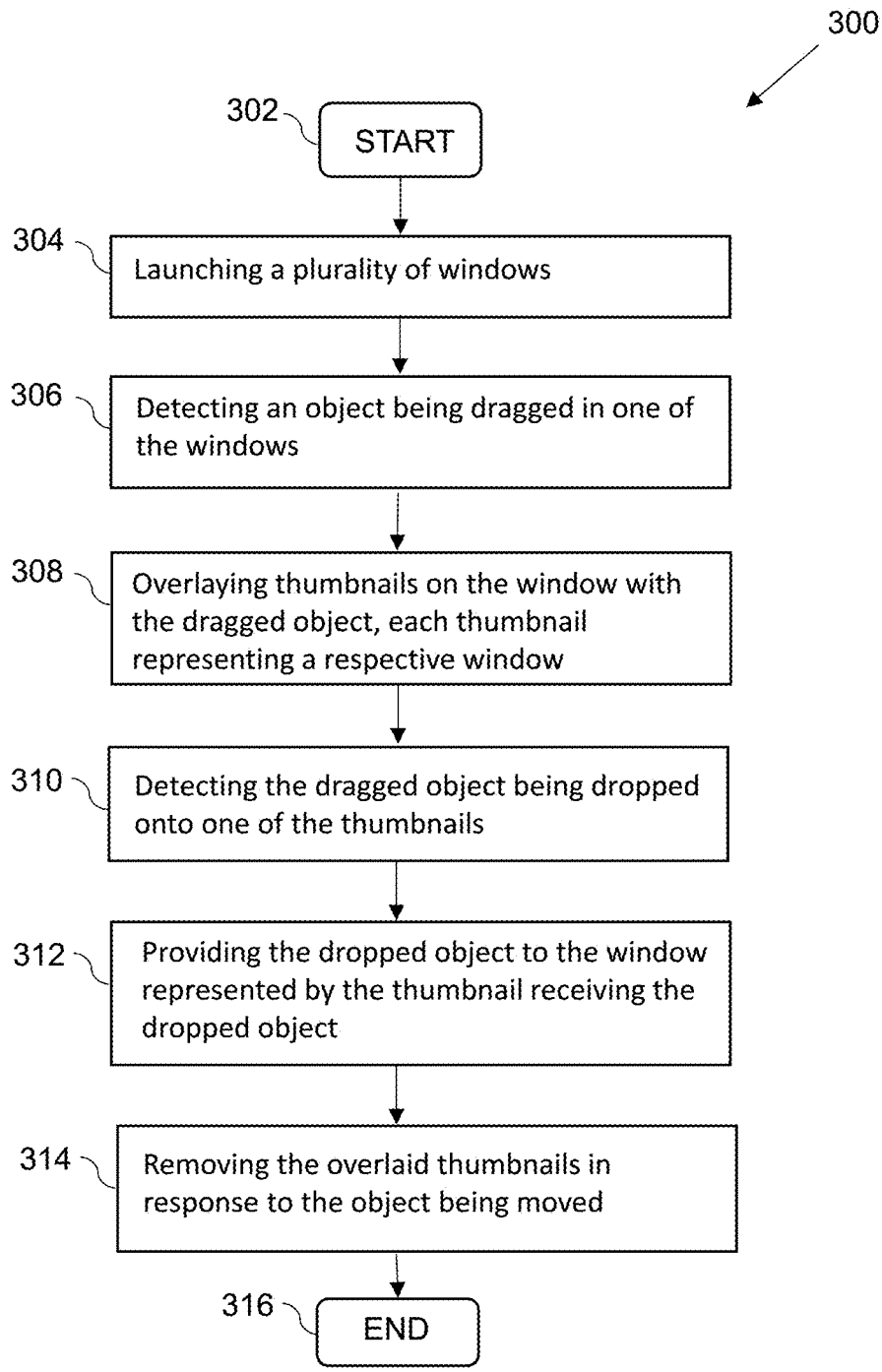
FIG. 15 is a flowchart illustrating a method for performing the drag and drop function as illustrated in FIGS. 9-14.

Referring now to FIG. 15, a general flowchart 300 illustrating a method for performing the above drag and drop operation will be discussed. From the start (Block 302), the method includes the client device 210 launching a plurality of windows on the monitors 222(1)-222(4) at Block 304. Monitor 222(1) provides the virtual desktop 254, while monitors 222(2)-222(4) provide application windows, for example.

At Block 306, the processor 214 in cooperation with the workspace app 70 in the client device 210 detects dragging of an object 274 selected within one of the windows, such as the window providing the virtual desktop 254 on monitor 1 222(1). The method further includes overlaying at least one thumbnail 290, 292a, 292b, 294 on the window with the dragged object 274 at Block 308. Each thumbnail represents a window on one of the other monitors 222(2)-222(4). Dropping of the dragged object 274 onto thumbnail 294 is detected at Block 310. The dropped object 274 is then provided (i.e., copied or moved) at Block 312 to the window on monitor 4 222(4) represented by the thumbnail 294 receiving the dropped object 274. The overlaid thumbnails 290, 292a, 292b, 294 are then removed at Block 314 in response to the object 274 being moved to monitor 4 222(4). The method ends at Block 316.

As noted above, the workspace app 70 keeps track of the various windows available within the multi-monitor setup 220 and within the single large monitor setup 230, as well as detecting when a user initiates the drag and drop function. The workspace app 70 also keeps track of how the windows are positioned with respect to one another.

Positioning information on the windows allows the processor 214 to overlay thumbnails that represent windows positioned in the direction of the dragged object while not overlaying thumbnails that represent windows in different directions. This is helpful when the user is familiar with the layout or positioning of the monitors 222(1)-222(4), and has a particular monitor in mind that is to receive the dragged object.

In the above drag and drop example, the monitors 1-4 222(1)-222(4) may be linearly (e.g., horizontally) positioned, but with monitor 1 222(1) between monitors 2-4 222(2)-222(4). Monitor 1 222(1), for example, may be in the second position while monitors 3-4 222(3)-222(4) are to the right of monitor 1 222(1). In other examples, the monitors 1-4 222(1)-222(4) may be vertically positioned, diagonally positioned, circularly positioned, or positioned in a grid pattern.

As in the above drag and drop example, the Excel icon 274 is still being dragged to monitor 4 222(4). Since the Excel icon 274 is being dragged to the right, the processor 214 overlays thumbnails 292a, 292b, 294 corresponding to monitors 3-4 222(3)-222(4). Thumbnail 290 corresponding to monitor 2 222(2) is not overlaid on monitor 1 222(1) since this monitor is in the opposite direction of the dragged Excel icon 274.

In addition to the workspace app 70 keeping track of how the windows are positioned with respect to one another, the workspace app 70 also determines compatibility of a selected object being dragged with respect to the application windows on the monitors. Compatibility is based on determining the context of the object being dragged, and the context of the application windows being displayed on the monitors 222(1)-222(4).

Context may be determined based on the file extension associated with the object being dragged and the file extensions associated with the windows that could receive the dragged object. If the object being dragged from monitor 1 222(1) is not compatible with the application windows on monitor 3 222(3), for example, then thumbnails corresponding to monitor 3 222(3) would not be overlaid in monitor 1 222(1).

As an example, the application windows on monitor 3 222(3) are media player application windows. The media player application windows are compatible with audio and video files. An example file extension associated with the media player application window is .asf, which stands for Advanced Systems Format.

If the object being dragged from monitor 1 222(1) is an Excel or Word file, for example, then the file extensions for these files are .xls and .docx, which are not compatible with the media player application windows. Assuming the Excel or Word file being dragged from monitor 1 222(1) is compatible with monitor 2 222(2) and monitor 4 222(4) but not compatible with monitor 3 222(3), then thumbnails corresponding to monitors 2, 4 would be overlaid on monitor 1 222(1). Thumbnails for monitor 3 222(3) would not be overlaid on monitor 1 222(1).

As noted above, a monitor may have multiple application windows that are opened, as on monitor 3 222(3). These application windows 257a, 257b may be overlapping, such that there is a foreground window and at least one background window.

A respective thumbnail 292a, 292b representing each one of these application windows 257a, 257b would appear on monitor 1 222(1) for the drag and drop operation. If a thumbnail corresponding to the foreground window receives the dragged object, then this application window on the monitor remains in the foreground. However, if a thumbnail corresponding to one of the background windows receives the dragged object, then this application window on the monitor becomes the foreground window.

Alternatively, a thumbnail representing only the foreground application window may appear on monitor 1 222(1) for the drag and drop operation. The background application windows would not be shown on monitor 1 222(1). The order of the overlaid items can be done in many ways such that the most recently interacted window overlay is closest. For example, one implementation could be such that the most recently interacted window overlay is in the center of all the overlaid thumbnails. Another example implementation could be that the overlaid items are arranged in a top down list. Yet another implementation could be that the overlaid items are arranged as a grid where each column in the grid is for each monitor, etc.

In the illustrated computer system 200, the client device 210 may interface with a second client device. The client device 210 may be a desktop and the second client device may be a laptop, for example. Both client devices are operating with the workspace app 70, and there is a secure connection between the client devices.

In the drag and drop function, a thumbnail representing a window on the display associated with the laptop may be displayed on monitor 1 222(1) alongside the thumbnails corresponding to the monitors associated with the client device 210. This allows the user to perform a quick drag and drop with the object to the display on the second client device.

Figure 16:
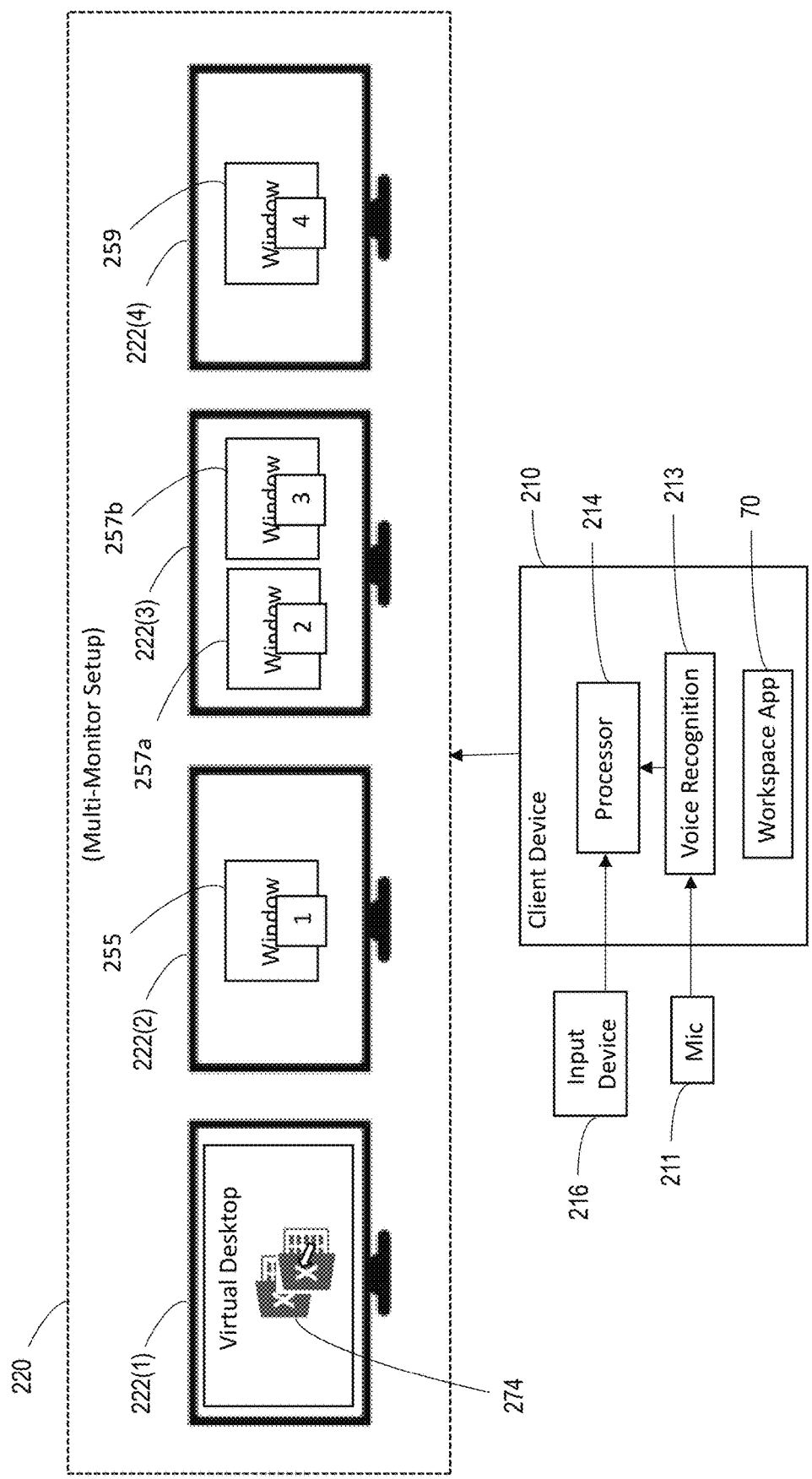
FIG. 16 is a schematic block diagram of the client device illustrated in FIG. 6 supporting the use of augmented keyboard shortcuts in the drag and drop operation.

As an alternative to the use of thumbnails in a drag and drop operation, augmented keyboard shortcuts may be used, as illustrated in FIG. 16. A user initiates a drag movement of an object in monitor 1 222(1) using the input device 216. As above, the Excel icon 274 is being dragged.

In response to the workspace app 70 detecting the Excel icon 274 being dragged, the workspace app 70 augments or overlays numeric numbers on the windows on monitors 2-4 222(2)-222(4). Each number corresponds to a respective window. Overlays of augmented numbers can also be on the thumbnails.

On monitor 2 222(2) a number 1 is placed on window 255. On monitor 3 222(3) a number 2 is placed on window 257a and a number 3 is placed on window 257b. On monitor 4 222(4) a number 4 is placed on window 259.

While the Excel icon 274 is being dragged, a user presses a keystroke on the input device 216 for one of the overlaid numbers: 1, 2, 3 or 4. In this example, the user inputs number 4. The processor 214 completes the drag and drop operation by dropping the Excel icon 274 onto the selected window 259 on monitor 4 222(4). In response to the Excel icon 274 being moved or copied to window 259, overlays of the numeric numbers are removed from the monitors 2-4 222(2)-222(4).

Another implementation of the keyboard shortcuts is where the user presses a first keyboard shortcut via the input device 216 for the monitor that is to receive the dragged object. For example, the user inputs number 3 for monitor 3 222(3). In response, the processor 214 overlays a number for window 257a and a number for window 257b. The user then presses a second keyboard shortcut for the window that is to receive the dragged object.

As an alternative, augmented voice input commands may be used instead of keyboard shortcuts to select the window to receive the dragged object. The user starts to drag the Excel icon 274 and then provides a voice command to a microphone 211. The microphone 211 may be coupled to a voice recognition module 213, for example, which is coupled to the processor 214. The voice command may be "drop on window 4." In response to the voice command, the Excel icon 274 is moved to monitor 4 222(4).

Figure 17:
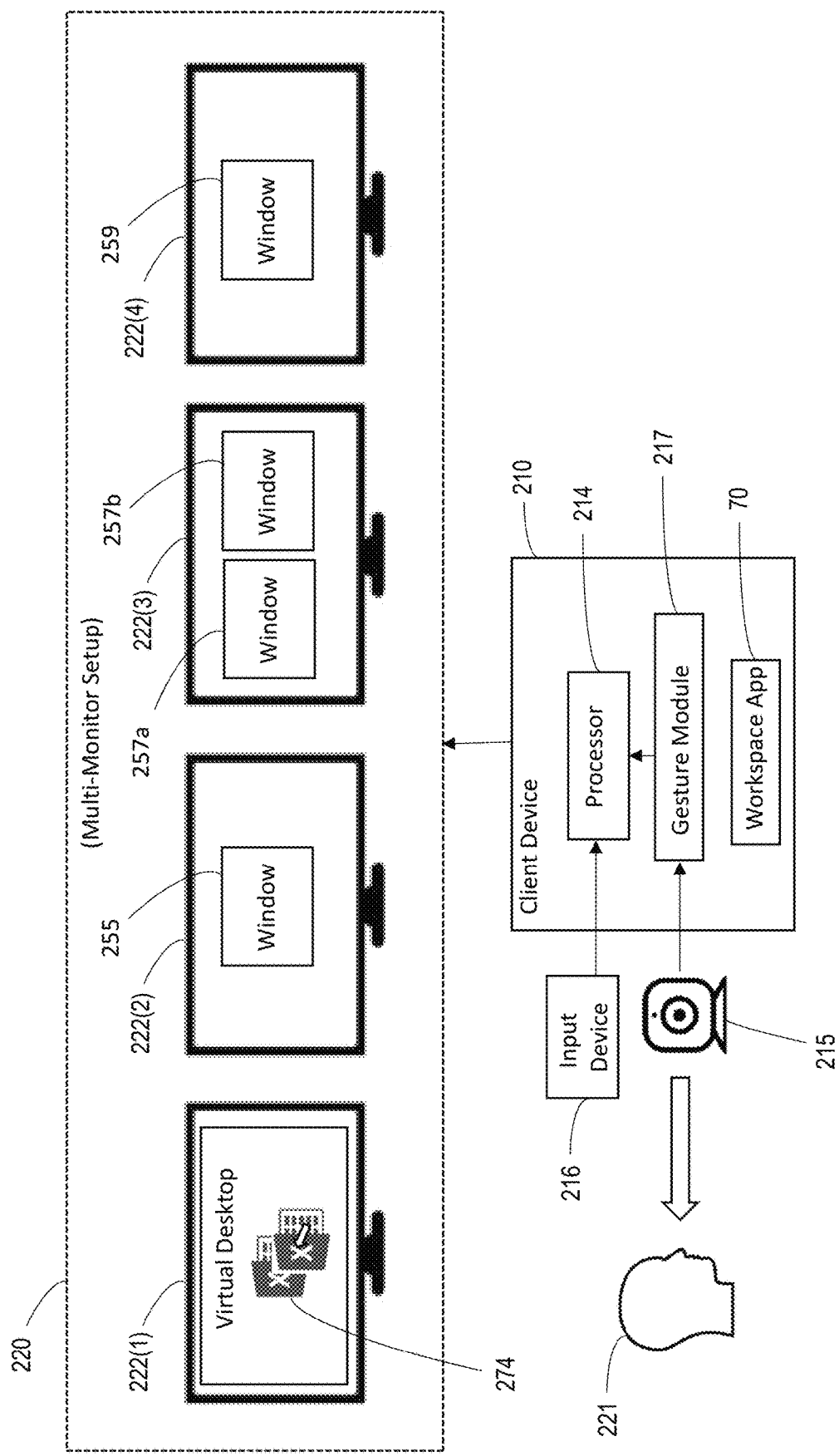
FIG. 17 is a schematic block diagram of the client device illustrated in FIG. 6 supporting the use of gestures in the drag and drop operation.

As an alternative to the use of thumbnails, augmented keyboard shortcuts and augmented voice commands in a drag and drop operation, gestures may be used, as illustrated in FIG. 17. A webcam 215 is directed towards the user 221 to monitor for gestures, such as eye movement. The webcam 215 provides input to a gesture module 217, which is coupled to the processor 214.

A user initiates a drag movement of an object in monitor 1 222(1) using the input device 216. As above, the Excel icon 274 is being dragged.

In response to the workspace app 70 detecting the Excel icon 274 being dragged, the processor 214 uses input from the gesture module 217 to determine the window that is to receive the dragged object. The gestures may be based on which monitor the user's head is tilted towards. Gestures may also include tracking eye movement of the user to determine which window is to receive the dragged object.

While the input device 216 is still used to select the Excel icon 274, the processor 214 moves the Excel icon 274 and the cursor 219 to monitor 4 222(4) since the user's head is tilted towards monitor 4 222(4). The user then drops the Excel icon 274 onto monitor 4 222(4) by releasing the input device 216.

Another aspect of the disclosure is directed to intelligent monitor and layout management for the above-described multi-monitor setup 220 and the single large monitor setup 230. This is based on the workspace app 70 monitoring application usage within the application windows to determine user patterns and preferences.

One feature of the intelligent monitor and layout management is directed towards making adjustments on how application windows are positioned and sized. These adjustments may be made based on context, user patterns and app affinity, for example. Another feature is directed towards making adjustments in roaming and casting scenarios. Another feature is directed to making adjustments of browser windows/tabs based on patterns, content and URL categorization. This may involve separating display spaces for personal versus employment use. Yet another feature is directed to a virtual monitor spanning across multiple physical monitors that accommodates adjustments in application window sizes based on content or context of a document opened within one of the application windows.

A user of the client device 210 may receive a notification recommendation if an application window is recommended to be repositioned, and a transparent overlay may be displayed representing where the application window is to be repositioned. The user may accept or reject the recommendation. Alternatively, the application window may be repositioned without user input.

Figure 18:
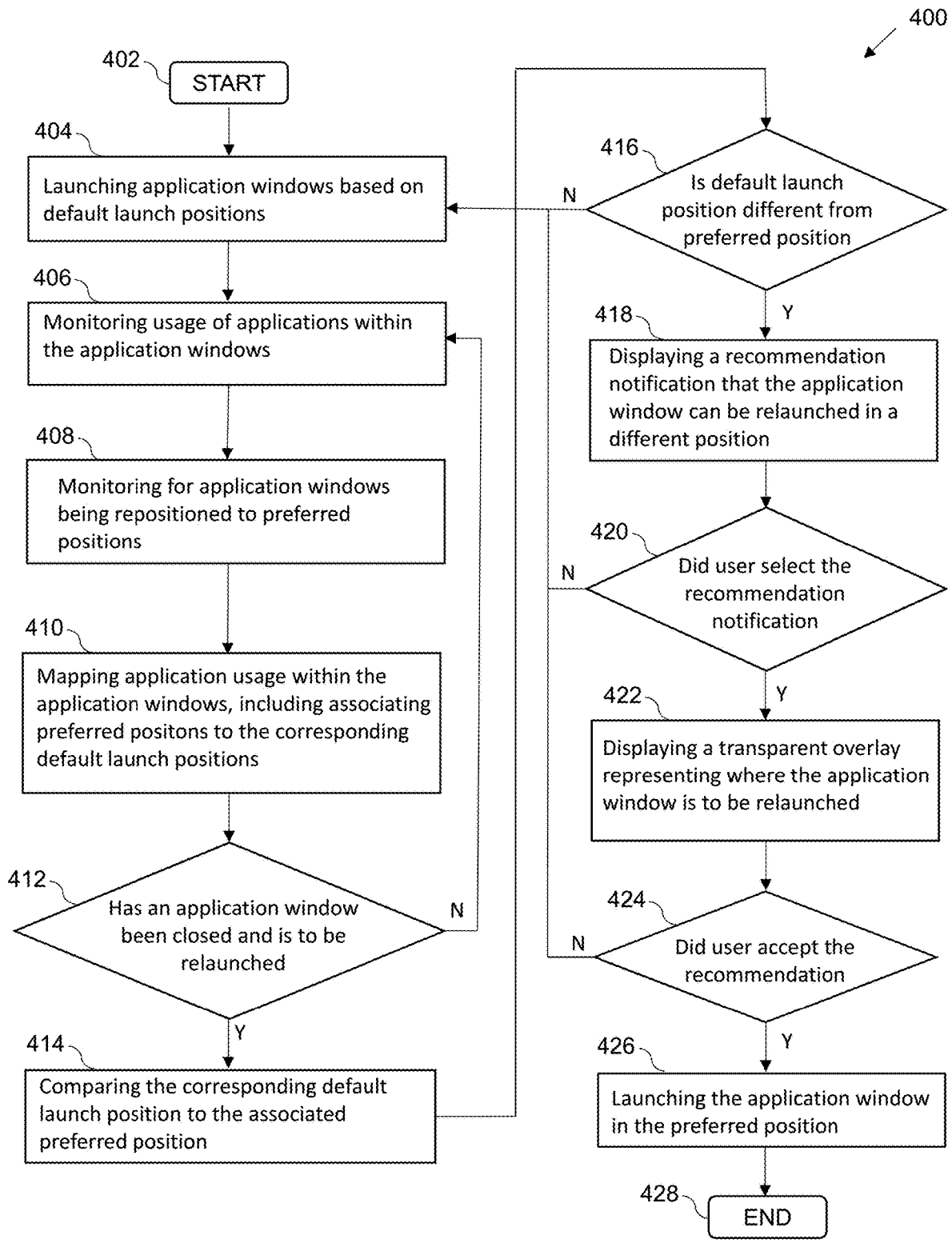
FIG. 18 is a flowchart illustrating an example method for intelligent monitor and layout management for the computer system illustrated in FIGS. 6 and 7 for a window being relaunched in a preferred position.

Referring now to the flowchart 400 in FIG. 18, an example method for intelligent monitor and layout management will be discussed. This flowchart 400 is from the perspective of a window being relaunched in a preferred position that may be different from the default launch position associated with the window. The relaunch of a window may be based on starting a new user session, or closing and relaunching a window during the same user session, for example.

From the start (Block 402), the method includes launching a plurality of application windows based on default launch positions at Block 404. When the application windows are initially launched, placement of these application windows may be based on user preferences as determined by the workspace app 70, or based on a local copy on the client device 210 from a previous session. Placement of these application windows may be referred as default launch positions.

The workspace app 70 monitors usage of applications within the applications windows at Block 406. Such usage may include monitoring at Block 408 for a user of the client device 210 repositioning at least one of the application windows to at least one preferred position.

For example, in the single large monitor setup 230, a media application window is opened in a default launch position, which may be in a top left virtual monitor. However, the user prefers that the media application window be positioned in a bottom right virtual monitor. Consequently, the user repositions the media application window from the default launch position (i.e., top left virtual monitor) to the preferred position (i.e., bottom right virtual monitor). For an application window that has not been repositioned, the default launch position for that application window remains the same.

Since the application window has been repositioned, the workspace app 70 determines that the preferred position for the media application window is the bottom right virtual monitor. The processor 214 maps usage of the media application within the media application window, including associating the preferred position to the default launch position at Block 410.

The workspace app 70 monitors for when an application window has been closed and is to be relaunched at Block 412. If the application window has not been closed, then the method loops back to Block 406 to continue to monitor application usage. If an application window has been closed and is to be relaunched, then the processor 214 compares the corresponding default launch position to the associated preferred position at Block 414.

A determination is made at Block 416 on if the default launch position is different from the preferred position. If the default launch position is the same as the preferred position, then the method loops back to Block 404 for the application window to be launched in the default launch position. In this case, the default launch position may have been updated with the preferred position, or the default launch position remained the same.

If the default launch position is different from the preferred position, then the processor 210 may generate a recommendation notification for display indicating that the application window can be relaunched in a different or recommended position at Block 418.

A determination is made at Block 420 on if the user selected the recommendation notification. If the user did not select the recommendation notification, then the method loops back to Block 404 for the application window to be launched in the default launch position. If the user did select the recommendation notification, then a transparent overlay may be displayed at Block 422 representing where the application window is to be relaunched.

A determination is made at Block 424 on if the user accepted the recommendation. If the user declined the recommendation, then the method loops back to Block 404 for the application window to be launched in the default launch position. If the user accepts the recommendation, then the application window is launched in the preferred position at Block 426. The method ends at Block 428.

Figure 19:
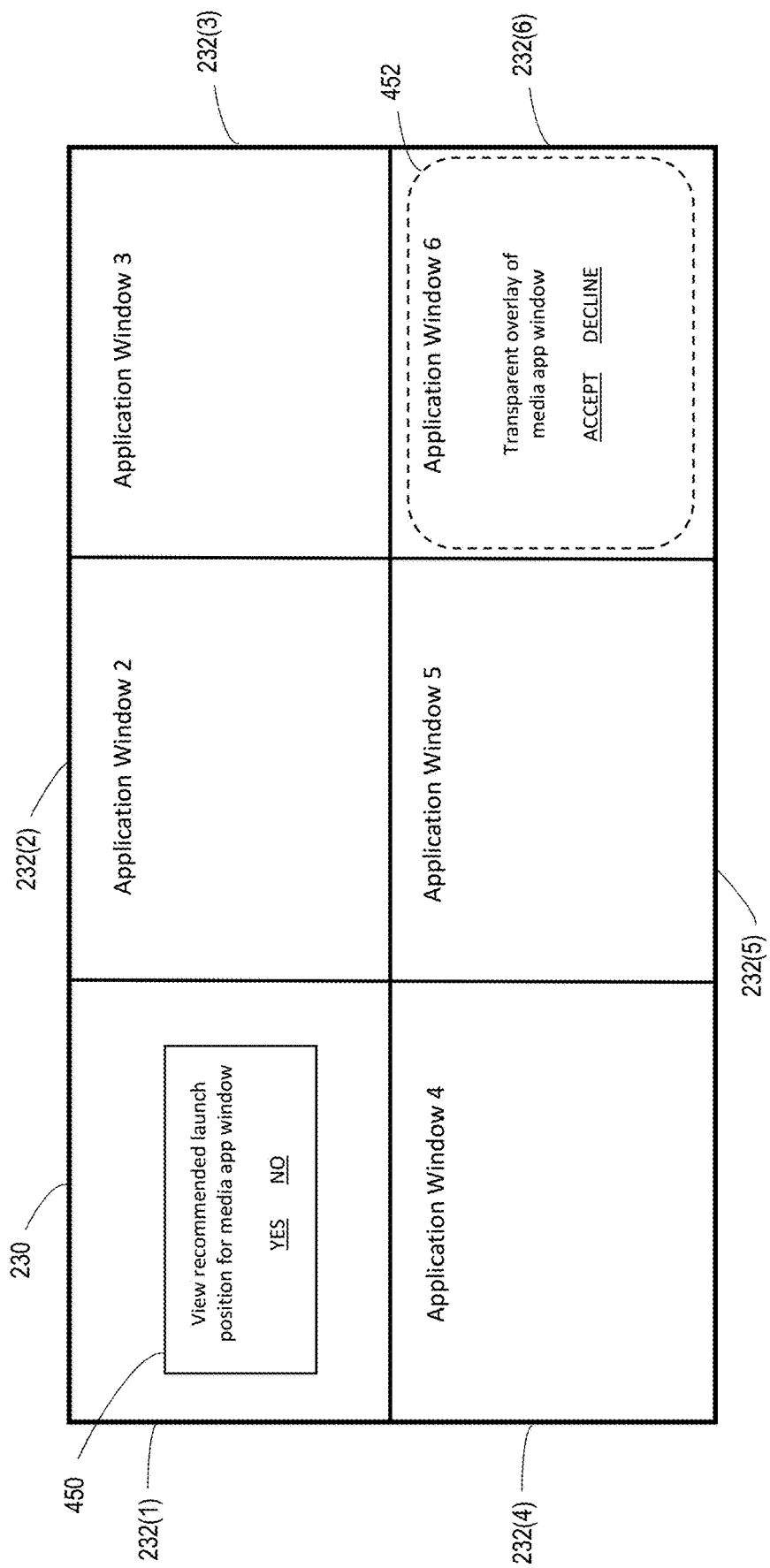
FIG. 19 is a schematic block diagram of a single monitor setup providing display of a notification message based on recommending a launch position for the window being relaunched in FIG. 18.

To illustrate the notification message, an example single monitor setup 230 is configured as six virtual monitors 232(1)-232(6), as provided in FIG. 19. The media application window has a default launch position on the top left virtual monitor, which is virtual monitor 1 232(1). With the media application, for example, the default launch position cannot be updated to a preferred position so that the application is always opened in the same default launch position.

On the other virtual monitors 232(2)-232(6), applications windows 2-6 have been launched. Based on previous monitored usage of the media application within the media application window, the workspace app 70 has determined that the user prefers to have the media application window on the bottom right virtual monitor, which is virtual monitor 6 232(6).

Prior to the media application window being launched, a notification message 450 appears on virtual monitor 1 232(1). The notification message 450 lets the user know that there is a recommended launch position for the media application window. The user has the option to select YES to view the recommendation, or to select NO to allow the media application window to be relaunched on virtual monitor 1 232(1).

If the user selects YES, then the processor 214 generates a transparent overlay 452 representing where the media application window is to be launched. In this case, the transparent overlay 452 is positioned on virtual monitor 6 232(6). The transparent overlay 452 outlines where the media application window is to be placed on virtual monitor 6 232(6).

The user now has the option to accept or decline the recommendation. If the user declines the recommendation, then the media application window is launched in the default launch position, which is virtual monitor 1 232(1). If the user accepts the recommendation, then the media application window is launched in the recommended position, which is virtual monitor 6 232(6). For the media application window to be launched on virtual monitor 6 232(6), the already launched application window 6 on virtual monitor 6 232(6) may be repositioned to another virtual monitor, such as virtual monitor 1 232(1).

Figure 20:
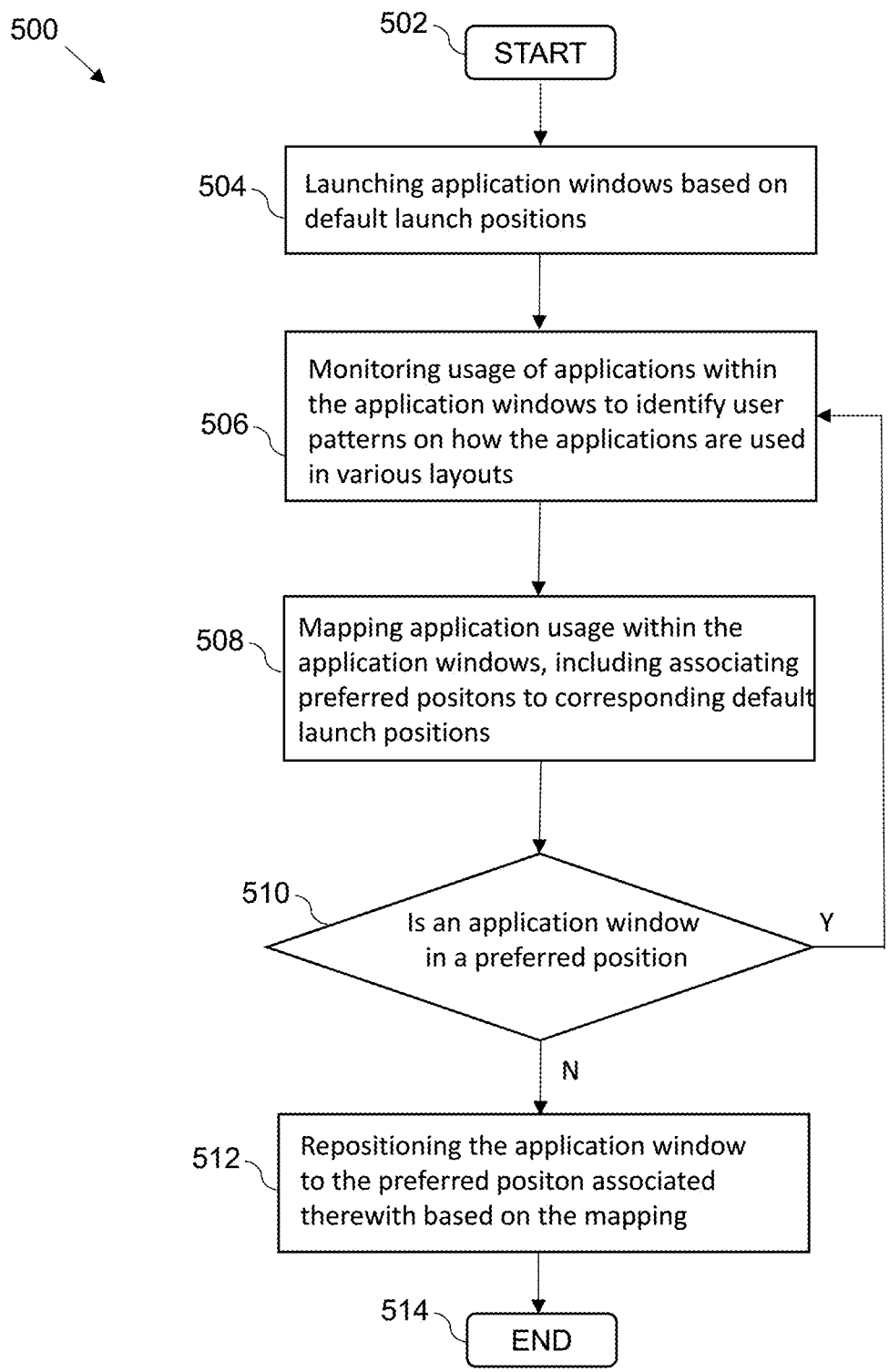
FIG. 20 is a flowchart illustrating an example method for intelligent monitor and layout management for the computer system illustrated in FIGS. 6 and 7 for a window being repositioned within a current user session.

Referring now to the flowchart 500 in FIG. 20, another example for intelligent monitor and layout management will be discussed. This flowchart 500 is from the perspective of changes being made to application windows (e.g., reposition, resize, etc.) within the same user session.

From the start (Block 502), the method includes launching a plurality of application windows on at least one display based on default launch positions at Block 504. When the application windows are initially launched, placement of these application windows may be based on user preferences as determined by the workspace app 70, or based on a local copy on the client device 210 from a previous session. Placement of these application windows may be referred as default launch positions.

The workspace app 70 monitors usage of applications within the applications windows at Block 506. Usage of the applications includes identifying user patterns on how the applications are used in various layouts on the at least one display. The various layouts correspond to preferred positions.

The method further includes mapping usage of the applications within the application windows at Block 508. The mapping includes associating the preferred positions to the corresponding default launch positions. The workspace app 70 monitors for when an application window is not in a preferred position at Block 510. If the application window is in the preferred position, then the method loops back to Block 506 to continue to monitor application usage. If an application window is not in the preferred position, then the application window is repositioned to the preferred position based on the mapping at Block 512. The method ends at Block 514.

Current multi-monitor setups 220 and single large monitor setups 230 have limitations. As discussed above, a user may spend a considerable amount of time every day managing their monitors/displays while using various applications and programs. The time and effort expended by a user repositioning and resizing application windows may negatively affect user productivity.

The intelligent monitor and layout management will now be described in greater detail in terms of identifying user patterns on how the applications are used in various layouts on the at least one display, with the various layouts corresponding to preferred positions. Since the workspace app 70 is able to monitor application usage within the application windows, this advantageously allows the user patterns to be identified. For discussion purposes, the use of monitors and displays are interchangeable, and include physical monitors, virtual monitors, augmented reality displays, and virtual reality displays, for example.

As above, a user of the client device 210 may receive a notification recommendation if an application window is recommended to be repositioned, and a transparent overlay may be displayed representing where the application window is to be repositioned. The user may accept or reject the recommendation. Alternatively, the application window may be repositioned without user input. To simplify the below description of the intelligent monitor and layout management, application windows will be repositioned without user input.

A display with an application window does not readily adapt to content and context of an application operating within the application window. For instance, one of the application windows may have more than one preferred position associated therewith within a same session based on usage of the application within the application window.

Figure 21:
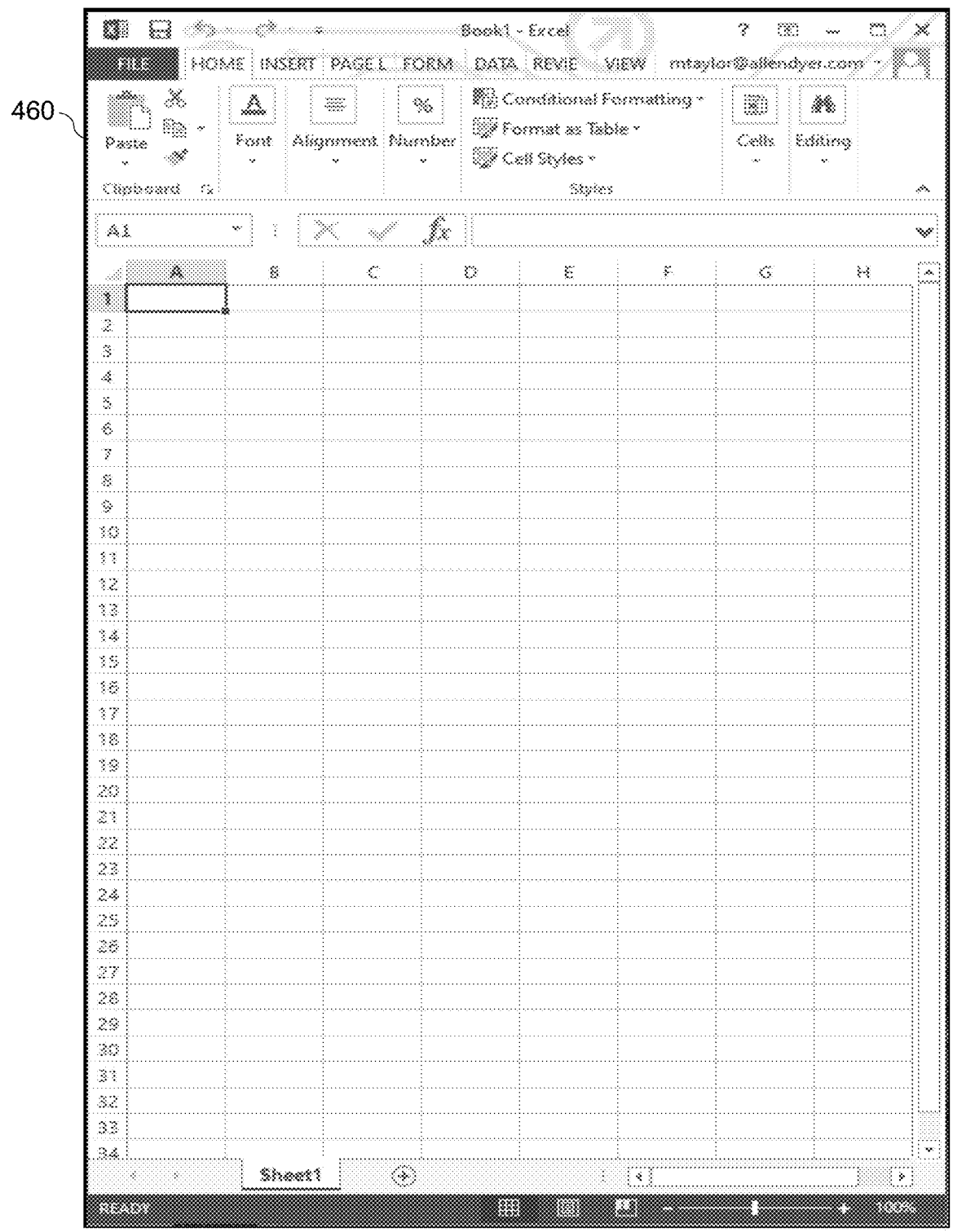
FIG. 21 is a screenshot illustrating content of a document within one of the application windows illustrated in FIG. 19.

In regards to content, a user may open an Excel document having a large number of rows, as illustrated by the screenshot 460 in FIG. 21. In other cases, a user may open an application with vertical scrollbars that do not launch on a particular monitor having more vertical space as compared to the other monitors. Similarly, an Excel document with a large number of columns does not readily launch on a particular monitor having a large enough horizontal space which can fit all or most of the columns. Content in some cases may be determined post opening the document. This may be based on using scroll bar positions and width to determine the content, for example.

Figure 22:
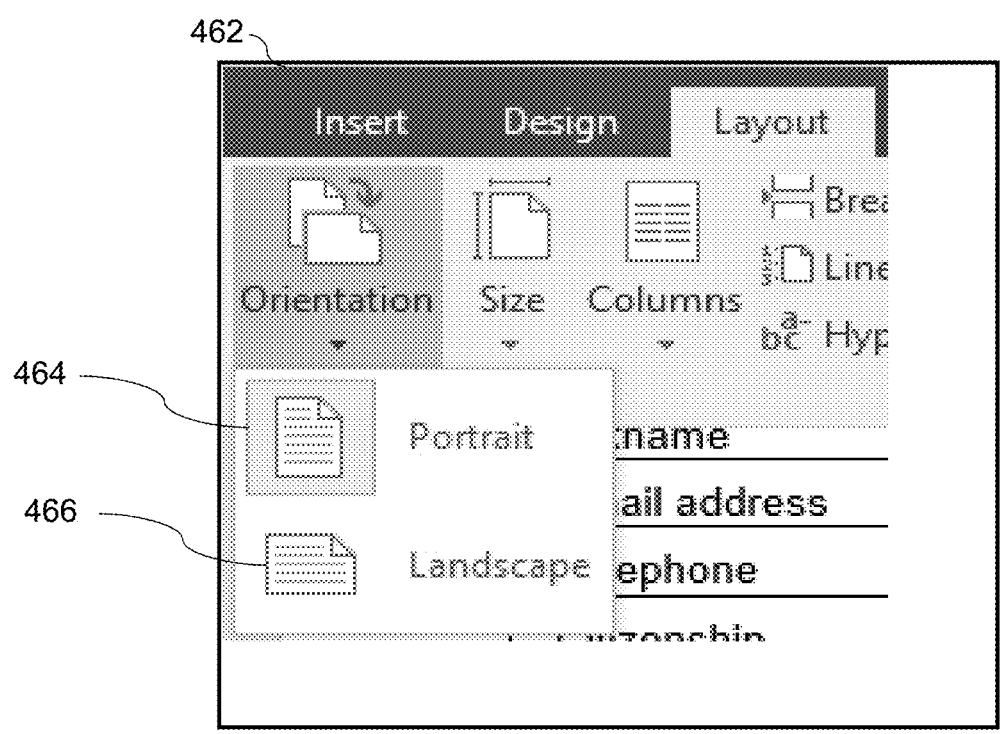
FIG. 22 is a screenshot illustrating context of a document within one of the application windows illustrated in FIG. 19.

In regards to context, a user may have to select between portrait 464 or landscape 466 in a word processing application, as illustrated by the screenshot 462 in FIG. 22. This changes the layout of the word processing application within the application window. Context in some cases may be determined post opening the document. In general, an application window may have more than one preferred position associated therewith within a same session based on usage of the application within the application window. Context may also dynamically change post opening the document.

In this case, the workspace app 70 is configured to monitor content of different documents opened within the application, with the different documents being used in different layouts on the at least one display based on the content associated with each respective document. Each layout corresponds to a preferred position.

Similarly, the workspace app 70 is configured to monitor context of different documents opened within the application, with the different documents being used in different layouts on the at least one display based on the context associated with each respective document. Each layout corresponds to a preferred position. Content in some cases may be determined post opening the document. This may be based on using scroll bar positions and width to determine the content, for example. Context may also dynamically change post opening the document.

Application windows are not readily positioned based on application affinity. Application affinity may correspond to similarity of characteristics between different applications.

A user generally positions applications that are frequently used together side-by-side on the same monitor or on adjacent monitors. This may involve applications where a user switches back and forth or copies content back and forth. Word and Excel are example applications that may be frequently used side-by-side.

The workspace app 70 is configured to monitor application usage within the application windows to determine applications that are used together. Identifying user patterns further includes determining applications that are used together where a user switches back and forth between the applications. If the application windows associated with the applications that are used together are spaced apart so that they are not side-by-side, then the workspace app 70 is further configured to reposition at least one of the application windows so that the applications windows are side-by-side.

Application windows are not readily positioned based on metrics. For example, average reading/writing interaction times per application are generally not considered for placing the application on a better suited monitor or display.

Monitoring usage of the applications within the application windows includes determining user interaction times with the respective applications. The workspace app 70 prioritizes repositioning of the application windows on the at least one display based on the user interaction times. Applications used more frequently should be placed front and center for the user.

Application windows are not readily positioned based on roaming and casting scenarios. Roaming is when a user switches from one device to another. Casting is when the user is still on the same device but just the display is being cast to an external display.

Application window layout/monitor configuration does not readily adapt to user preferences/patterns while moving across various monitor setups with the same or different number of monitors. For example, a user can login into workspace and then open a desktop with multiple applications or open many seamless applications and position them in a multi-monitored environment. The user may then disconnect and go to a meeting room with a laptop operating in a small single monitor environment, or the user connects the laptop to a projector which has a larger display area.

In another example, a user may switch between a multi-monitor setup at the user's desk/office and a single monitor setup at home. In this case, a user may move to a different workstation or monitor setup with fewer or more monitors, and with different forms factor and structures. The workspace app 70 allows that user's client device 210 to dynamically adapt to the change in setup. This advantageously avoids requiring the user to rearrange the application windows when there is a change in setup.

In terms of roaming, the client device 210 is associated with a first workstation, and in response to the user of the client device 210 roaming to a second workstation with a different display setup, the following steps are performed. The steps include monitoring how the application windows are currently positioned on the at least one display for the first workstation. The steps further include monitoring and mapping how the application windows are repositioned on the different display setup during the roaming to the second workstation. The displays are switched back to how the application windows were currently positioned on the at least one display in response to the user roaming back to the first workstation. A next time the user roams back to the second workstation, the application windows are repositioned based on the mapping performed during the roaming to the second workstation.

Alternatively, the user may cast their display using workspace hub, for example. In these scenarios the workspace app 70 is able to know the setup that the user had based on past roaming or casting using the different monitors, and adapt accordingly.

One example is a user switching between their desk/office and a meeting/conference room having different monitor setups. The user may have a multi-monitor setup at their desk/office but a single display laptop setup in the meeting/conference room.

In the meeting/conference room, the user may mirror/extend their laptop display to a different setup with fewer monitors, and then come back to their desk/office having the multi-monitor setup. As the user moves from the multi-monitor desktop setup to the meeting room usually having one monitor, the workspace app 70 changes the multi-monitor layout to one monitor. This is based on prior use of how the user adapted to the one monitor. Then, when the user goes back to the multi-monitor desk/office setup, the workspace app 70 will rearrange the application windows as they were before on their multi-monitor setup.

In terms of casting, the workspace app 70 monitors how the application windows are currently positioned on the at least one display. The at least one display is cast to an external display. The workspace app 70 monitors and maps how the application windows are repositioned on the external display during the casting.

The workspace app 70 then switches back to how the application windows were currently positioned on the at least one display in response to the casting being stopped. A next time the at least one display is cast to the external display, the application windows are repositioned based on the mapping performed.

Application window sizes do not readily adapt dynamically based on user needs. Referring to the screenshot 470 in FIG. 23, there are four windows for four different applications in four quadrants on a screen. The four application windows are referred to as app windows 1-4 472-478. Changing the size of one application window requires the user to change the other three application window sizes or move them around.

Figure 24:
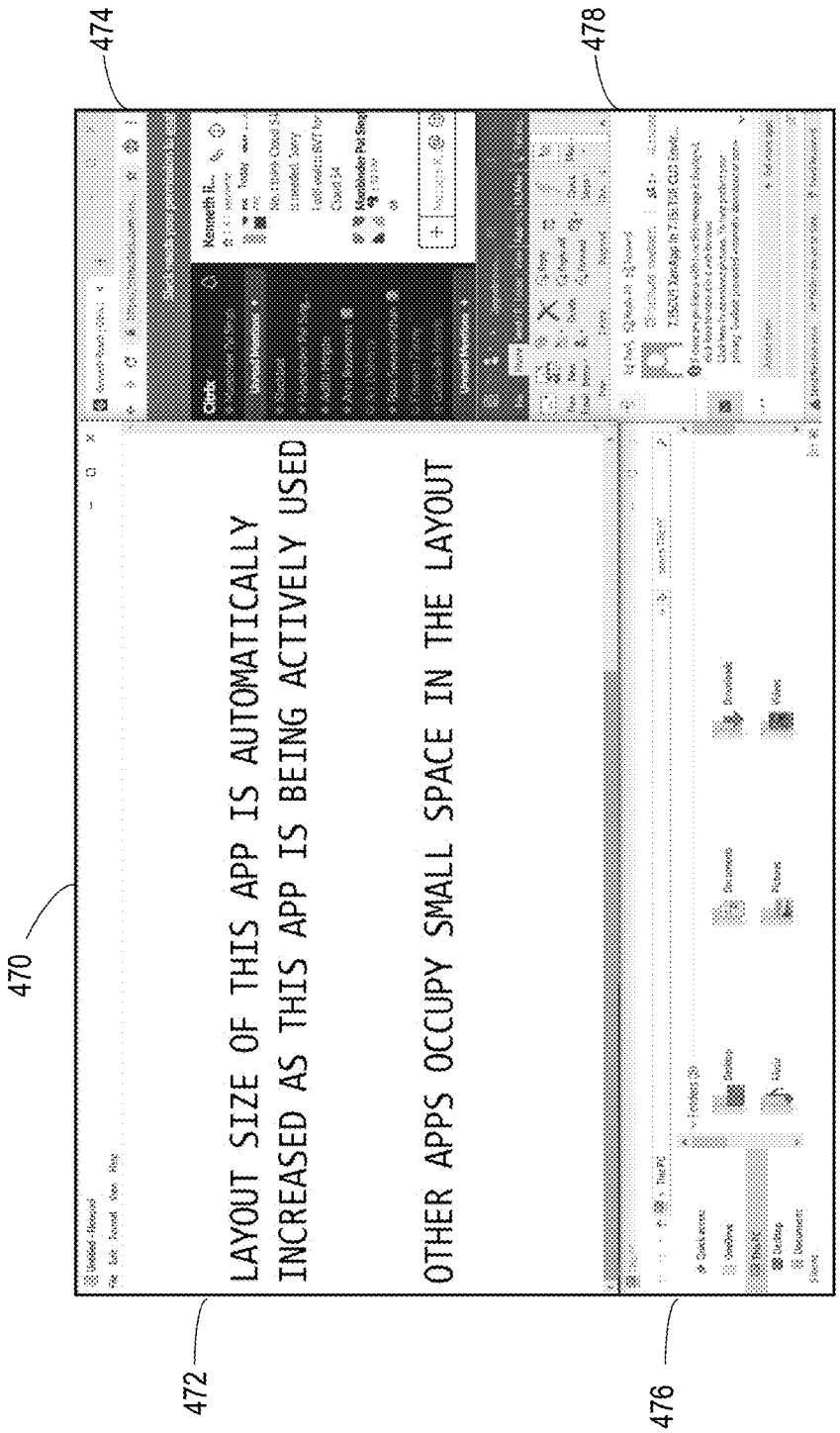
FIG. 24 is a screenshot illustrating the application windows in FIG. 23 with adjusted sizes based on one of the application windows being actively used.

App window 1 472 may be a notepad window, for example. The notepad window 472 is typically launched in its default position. App windows 2-4 474-478 are also launched in their default positions. Each illustrated app window 1-4 472-478 has the same size. However, the workspace app 70 is able to monitor that when the user is actively using the notepad window 472, for example, the user prefers a larger area. As now illustrated in FIG. 24, the workspace app 70 detects when the notepad window 472 is being actively used, and grows a size of the notepad window 472 while the sizes of app windows 2-4 474-478 are reduced.

When the user is no longer using the notepad window 472 and switches to a different application, then app windows 1-4 472-478 are returned to their normal default launch sizes. In some cases the user may receive a recommendation notification before the app windows 1-4 472-478 sizes are changed. In other cases, the changes are made without user confirmation.

Accordingly, at least one of the application windows has a first size when not being actively used, and a second window size when being actively used, with the second window size being larger than the first window size. The workspace app 70 is further configured to monitor activity of the at least one application window, and adjust the at least one application window between the first and second window sizes based on the monitored activity.

The at least one application window may be adjacent at least one other application window on the at least one display. The workspace app 70 is further configured to adjust a size of the at least one other application window to accommodate the first and second sizes of the at least one application window.

Figure 25:
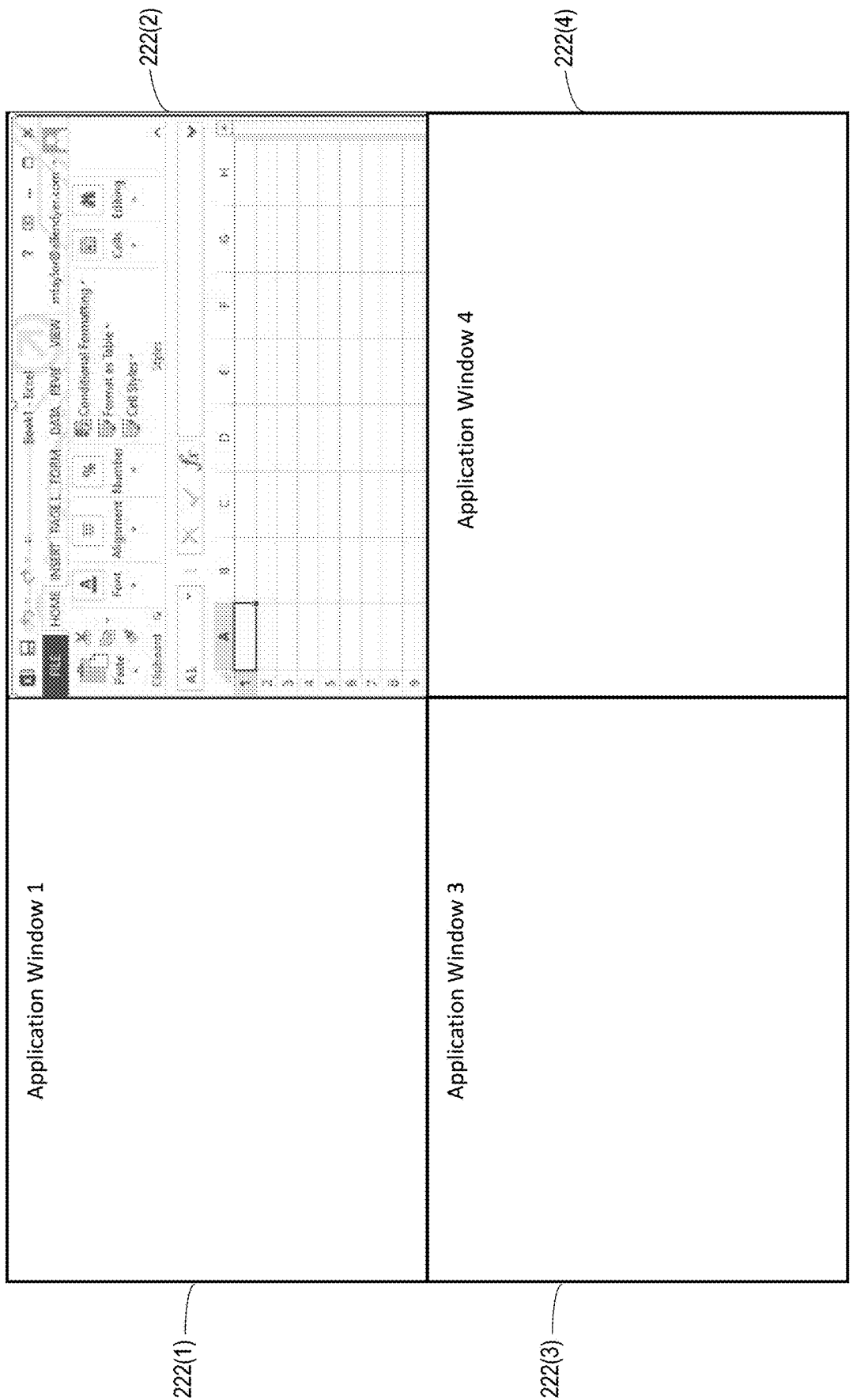
FIG. 25 is a schematic block diagram of four physical monitors positioned in a quadrant setup.

Application window sizes do not readily adapt dynamically based on user needs when using physical monitors. For example, four physical monitors 222(1)-222(4) as illustrated in FIG. 25 are in a quadrant setup, with each monitor having a respective application window. The application window on monitor 222(2) provides an Excel document, for example.

The workspace app 70 is able to make adjustments based on content/context of one of the application windows. For example, the Excel document on monitor 222(2) has a large number of rows (i.e., content). In another example, the user may be doing a large number of scrollbar UI operations (i.e., context).

Figure 26:
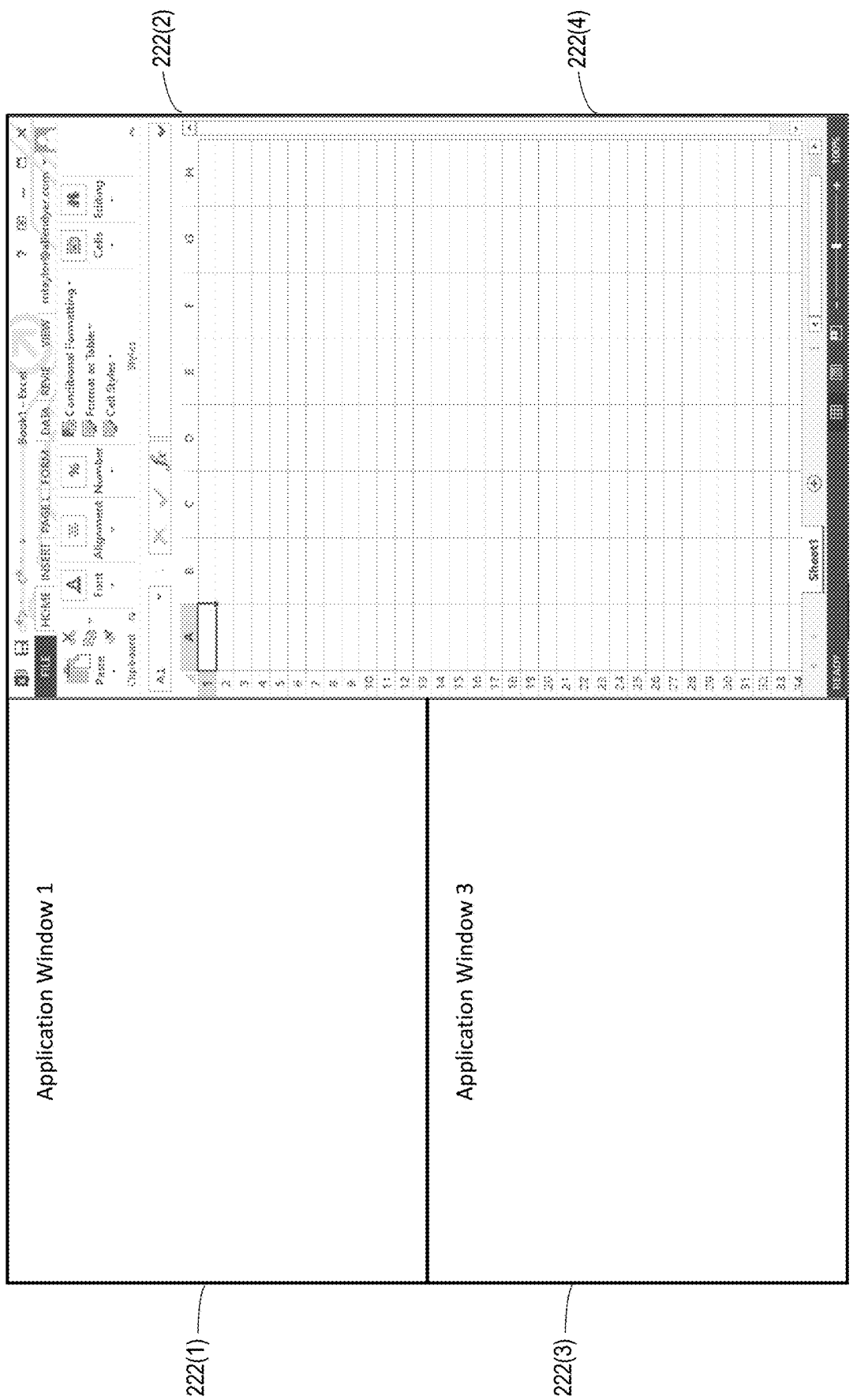
FIG. 26 is a schematic block diagram of the four physical monitors in FIG. 25 with a virtual monitor now spanning two of the physical monitors.

For the Excel document, the application window needs to be expanded in the vertical direction. This is accomplished by configuring a virtual monitor that spans two of the physical monitors, i.e., physical monitors 222(2) and 222(4), as illustrated in FIG. 26.

Consequently, the size of the Excel document is enlarged. Application windows 1 and 2 on physical monitors 222(1) and 222(3) remain the same size, and application window 3 that was on physical monitor 222(4) has been removed. When the Excel document is closed, the application window sizes on physical monitors 222(1)-222(4) may return back to their initial sizes.

Accordingly, the at least one display may include a plurality of physical monitors, with each physical monitor having at least one application window displayed thereon. The workspace app 70 is further configured to monitor at least one of content and context of a document opened within one of the applications. The document may require a larger display area based on at least one of predetermined content and predetermined context. A virtual monitor is then created to include at least two of the physical monitors to provide the larger display area for the document being monitored.

Positioning of browser windows/tabs based on user preferences is not readily available. When a URL or address is launched in a browser window/tab, a user may rearrange or move the browser window/tab around to a preferred position. For example, a user may prefer to launch multimedia on a specific monitor/display configuration.

In this case, application preferences in windows are for windows applications. There are no preferences for individual tabs/windows in a browser. Many users may have tens of tabs opened all in one window or multiple ones.

The intelligent monitor and layout management is useful to separating out work versus personal tabs or to group into separate windows based on the URL categorization and/or on different screens. Also, the tabs used frequently together may be grouped/placed side-by-side or in the same/different browser windows. For example, in a multi-monitor setup, a monitor on the left hand side may get social/banking or personal tabs, while a monitor on the right hand side gets work related URLs.

In some configurations, a Gateway may monitor any new URL for web/SaaS apps or windows apps (e.g., clicking a link in a published Word doc) and use Internet Categorization NetStar Service to classify the URL/content as social or financial or business, etc. This service can also classify a URL as work-related or as non-work related. This information is delivered to the workspace app 70 and/or virtual delivery agent (VDA) on the client device 210 which monitors the window for the browser and various categorization of URLs (shown in different tabs). The VDA is provided by Citrix.

Web/SaaS apps may be launched on the client device 210 using a Chromium embedded browser, for example. For the web/SaaS apps, the categorization information associated therewith is passed to the workspace app 70.

Web/SaaS or URL's may be launched on a VDA. The VDA may receive the categorization information from the gateway and via a virtual channel passes it onto the common connection manager (CCM) on the client device 210 and eventually to the workspace app 70. The CCM is discussed in greater detail below with respect to implementation of the intelligent monitor and layout management.

The workspace app 70 is also aware of a laptop monitor versus an attached multi-monitor setup. For example, personal/social/financial, etc. URL's may be moved to the laptop monitor screen. With the desktop session on a multi-monitor setup and with a local desktop on the laptop screen, the workspace app 70 can launch URLs or other applications to be shown on the laptop screen and not to overlap on the remote desktop window.

The client device 210 is configured to launch at least one browser window on the at least one display, with the at least one browser window including a plurality of open web pages based on default launch positions. Usage of the open web pages within the at least one browser window is monitored to identify user patterns on how the open web pages are used in various layouts on the at least one display. The various layouts correspond to preferred positions.

Usage of the open web pages within the at least one browser window is mapped, with the mapping including associating the preferred positions to the corresponding default launch positions. At least one of the open web pages is repositioned to the preferred position associated therewith based on the mapping in response to the at least one open web page not being in the preferred position.

The mapping further includes associating respective web addresses to the preferred positions of the open web pages. Classification of the web address may be work classifications or personal classifications, for example.

Implementation of the intelligent monitor and layout management for the multi-monitor setup 220 and the single large monitor setup 230 will now be discussed in greater detail. The implementation will be divided into three areas. The first area is identifying user patterns and preferences. The second area is recommending the changes to the user. The third area is moving windows to a layout and monitor.

As noted above, the workspace app 70 monitors the windows and user interaction of each application within the windows to identify user patterns. In addition, a high definition experience (HDX) engine 82, as also noted above, can be used to monitor the windows and user interaction.

The HDX engine 82 establishes connections to virtual browsers, virtual apps and desktop sessions running on an operating system. With the HDX engine 82, operating system resources run remotely, while the display remains local on the endpoint. To provide the best possible user experience, the HDX engine 82 utilizes different virtual channels to adapt to changing network conditions and application requirements.

There are different instances of the HDX engine 82 that, and generally speaking, these instances may correspond to a specific desktop or application. With the HDX engine 82, seamless application sharing can be provided where different virtual applications can share a session for scalability reasons. Different HDX connections are being hosted by different client side engine modules, and a common connection manager manages these connections. The common connection manager functions as a central service endpoint through which the positioning or the layout of the virtual windows of the local representation of the virtual apps and desktops can be controlled.

For the first area of implementation, there are different mechanisms to identify user patterns and preferences. One mechanism is to identify which monitor and display configuration a user most prefers for an application.

Application program interfaces (APIs) may be used to identify user patterns and preferences. For example, MonitorFromPoint, MonitorFromRect, and MonitorFromWindow API's may be used to determine the monitor being used by an application. EnumDisplayMonitors, EnumDisplayDevices, and GetPhysicalMonitorsFromHmonitor API's may be used to determine all the monitors and display devices for the client device 210. GetMonitorInfoA and GetMonitorCapabilities Windows APIs may be used to monitor capabilities and configurations. EnumDisplaySettings APIs may be used to determine display settings.

Mapping tuple of user's preference of applications to monitor/display configuration may be used. A tuple is a finite ordered list (sequence) of elements. The mapping is monitored based on users' patterns and is stored. The mapping is between an application and monitor form factors/configurations, application and display settings, and application and layout on the screen (e.g., full screen or occupying a portion of the screen, and position).

Periodic snap shots may be taken using API's mentioned above to record mapping tuples. This period may be a statically defined period of every N minutes, or may be a bell curve distribution graph based using average application run times, or may be an average runtime for each application. Average runtime may be an average time interval between launching an application and closing the application. Per application, the average runtime for some applications may be long lived while for other applications may be short lived. The average runtime may also be globally based average run times.

Periodic snapshots may be taken over a monitoring period of N days. The top 1-3 monitor/display preferences, for example, may be identified for an application. If there are multiple applications whose preference order is the same then an application which should be given a monitor can be decided based on a number of factors, such as most time spent by an application, content preference, etc.

Event based snapshots may be used. A snapshot may be recorded only when the application is resized, moved, launched or closed. This may result in fewer snapshot points as compared to periodic snapshots. For example, a user may launch an application, such as Outlook, and keep it on the same monitor in a specific layout and does not make any changes.

Orientation and layout of how a user prefers an application may be used to identify user patterns and preferences. This may involve a static or dynamic method.

A static method involves using targeted UI automation event hooks/handlers for common applications. For example, in a Word application the user may choose between portrait and landscape. When the Word application is to be launched, the UI automation hook/handlers will be loaded, and these UI hooks/handlers will specifically look for clicking of orientation: portrait or landscape. This user choice is stored as a user preference for the application.

A dynamic method is for applications where it is unknown which menu item results in an orientation and layout change. Using hooks and UI automation, it is possible to monitor any click events. If a single user click changes the window size drastically from its previous window size, then this will be identified as a UI operation which triggers the layout/orientation within an application. This is considered as a discovery phase. An application remains in the discovery phase until a set number of days is determined, or a number of launches is determined, or until such a UI operation is detected. Once the menu items or UI operations within an application are determined that results in an orientation or layout change to be used, the discovery mode can be exited and only hooks and event handlers are enabled for the specific menu items.

Metric based layout/monitor preferences may be used to identify user patterns and preferences. Average overall run time for each application may be used. Average run time corresponds between when an application launches and until the application is closed.

Interaction session of an application may be used. A first application, such as Outlook, may be running all the time and visible on a monitor, but a user may actively interact with it or use it for a few minutes. For example, the user is reading an email or replying to an email. The user then interacts with a second application for a few minutes and then interacts with the first application again. Each such duration of interaction with the first application is called an interaction session of an application.

Average interaction session time for an application may be used. This is the average of all such session times where the user used/interacted with the application. This may involve average reading interaction session time, or average typing interaction session time.

Average reading time for an application may be used. This specifies reading time on an average a user spends in various interactive sessions of the application. This may be determined using a webcam that tracks eye/face movements of the user.

Average typing time for an application may be used. This specifies average time in minutes a user spends typing in a session of the application. This is determined using the keyboard events received by the application/window. Applications with the highest metrics are given preference for monitor/layout management as compared to applications with lower metric scores.

Machine learning based recommendations may be used to identify user patterns and preferences. There are several methods for data collection for machine learning. One method is periodic interval based data collection. This may be a global vs per application period interval, or a dynamic period. The dynamic period is adjusted based on the average application lifetime/runtime. Since this is interval based, so even if the application has not changed the monitor or layout, the data is collected. Any duplicate data can be removed for machine learning processing.

Another method for machine learning is event based data collection. Data collection is done for an application only when a layout, monitor or size of the window changes. This method does not collect any duplicate data since it is event based.

For discussion purposes, consider the mock data in TABLE 1 for machine learning. The data is collected as the user interacts with various applications across multi-monitors.

TABLE 1

| App Name | Interaction Duration (Short = <5 minute, Medium 5-15 minute, Long >15 minute) | Interaction Type | Monitor Configurations | No. of Monitors | Display Configurations | Window Layout | Location |
|---|---|---|---|---|---|---|---|
| App 1 | Short(1 minute) | Reading/Watching | X by Y, Vertical Layout, Monitor form factor dimensions etc. | N1 | Resolution parameters | . . . | Work desk |
| App 1 | Medium(12 minute) | Writing | Y by Z, etc. | N1 | . . . | | Work desk |
| App 1 | Long (25 minute) | Writing | . . . | N1 | . . . | | Work desk |
| App 1 | Medium(15 min) | Writing | . . . | N2 | . . . | | Home desk |
| App 2 | Short(5 minute) | Reading | . . . | | . . . | | |

For column with the number of monitors, a user's behavior on how the user uses the monitors/layout may differ as the number of monitors changes. This is another useful data point for the machine learning.

In the location column, location can be determined using maps service and Citrix maps to identify workspace location, or using meeting room name, or using home/work network, etc., to identify a work vs home location.

In the window layout column, on a vertical screen, an application window can be at the top or bottom or in a split-screen scenario. An application may occupy the left-hand side (LHS) or the right-hand side (RHS) of the monitor. A window location within a monitor provides data points to help identify user patterns. Each of the data points may be converted to one hot encoding which is required for machine learning. For example, short, medium, long in the interaction duration column will become 1, 2, 3 for the machine learning algorithm. Likewise, for example, work desk becomes 1, home becomes 2 and meeting/conference room becomes 3 if conference room numbers are also identified as distinct.

There are several algorithms that may be used for data collection for machine learning. One is a correlation based recommendation. For example, Pearson's R correlation algorithm can be used to recommend a monitor for an application that is similar to a monitor a user has already used for a given application. Another one is a classification based collaborative filtering algorithm, such as Logistic regression and Naïve Bayes.

The second area of the implementation is directed to recommending layout/monitor changes to the user. A number of different triggers may be used in making the recommendations.

Application affinity triggers may be used. This can be user configured where one could say open word and application 2 on side-by-side monitors, or on a split screen layout, or it can be determined based on the application affinity.

User pattern triggers may be used. For applications which are always used on a specific monitor, for example, greater than 90% of the time, the same specific monitors can be used.

Machine learning based triggers may be used. This is based on the patterns identified, and then the layout/monitor will be suggested.

Autonomous triggers may be used. This is where user preference or acceptance on using the suggestion above can be saved locally and in the workspace app 70, and may be used right away whenever the application is launched, Visual Recommendation may also be used. Recommendation of various application windows across the available monitors is shown with transparent (i.e., less opaqueness) windows so as to be able to identify the windows (titles) being recommended. A user might click on each window or on all windows on a monitor, or all windows across all monitors.

The third area of the implementation is directed to restructuring and moving of window(s) to a specific monitor. APIs may be used. For example, SetWindowsPos and SetWindowPlacement API's are used to position the window and/or BeginPaint for the window to be painted. BeginDeferWindowPos and DeferWindowPos API's are used to position multiple windows of a process/application simultaneously. Gesture APIs may be used in mixed reality. Windows mouse/keyboard events may be used to provide shortcuts and automation for restructuring.

There are mechanisms to restructure and move a browser tab to a specific or new browser window. Internet categorization service, such as Netstar, may be used to categorize a URL or web/SaaS application launch request using the APIs. This categorization can be performed on the gateway, VDA using Browser Helper Object (BHO) or Browser Extension, and using BHO or Browser Extension in an embedded browser or common connector manager. A BHO or a Browser Extension is a module configured as a plugin for a web browser to provide added functionality.

Mapping tuple or URL category to monitor/display configuration may be stored. For example, a user may prefer a multimedia/Youtube URL on a specific monitor. Mapping tuple of user's preference of an application to a monitor/display configuration may be stored. The mapping includes the following: URL/Web/SaaS App Category to monitor form factor; URL/Web/SaaS App Category to display settings; and URL/Web/SaaS App Category to a monitor layout.

Three different methods may be used in restructuring and moving of window(s) to a specific monitor. A first method uses BHOs or Browser Extensions. BHOs/Browser Extensions help in moving tabs across windows. Chrome.tabs.move API may be used to specify the destination WindowId where the tab should be moved. WindowId is passed via the virtual channel to the VDA and sent to the BHO/Browser Extension loaded within the browser.

A second method uses keyboard/mouse events. For example, clicking a tab and drag drop of the tab onto the target window may be done using mouse events. The embedded browser or common connection manager may pass the destination window position for the drag/drop operation to be performed.

A third method is to bring your own device or laptop use case. Based on the URL categorization, a URL moves to the laptop screen. This could be a user preference or identified with a user pattern.

There are mechanisms to do layout changes of a window. For example, APIs may be used, and office automation APIs may be used. To launch or connect to an already launched office application, GetObject and CreateObject may be used. GetObject and CreateObject are functions that are provided by Microsoft Visual Basic and Microsoft Visual Basic for Applications (VBA). However, the information is also applicable to Microsoft Visual C++ if references to GetObject are treated as calls to the GetActiveObject API, and references to CreateObject are treated as calls to the CoCreateInstanceAPI.

Orientation APIs may be used. For example, PageSetup.Orientation property (Word) may be used to change the orientation of a document.

Open Office Format is written in an XML format, which consists of a ZIP archive file containing XML and binaries. Content can be analyzed by unzipping the file (e.g., in WinZip) and analyzing the contents of the archive.

Document properties like word/sentence count, etc., can be obtained without really opening the document by using a temp copy of the docx file and getting attributes from the xml files.

Portrait/landscape can be changed using this property in the docx file before as well as after the document is opened by detecting the number of pages/words/lengths of sentence, etc.

The PortraitPage simple type is a Boolean that specifies the orientation of a page. By default, a page has a portrait orientation. A 0 value corresponds to a landscape orientation, and a 1 value corresponds to a portrait orientation.

One option is to unzip the docx file and update the mode/orientation in an xml file and save and zip it back to a docx file.

Another option is where based on the document content/attributes, it is identified that an orientation should be changed/applied. UI automation hooks may perform a menu item click to adjust the orientation based on the content. When these menu item windows are clicked they are not shown to the user. That is, a graphics remoting virtual channel can be instrumented to not transfer the menu item display to the client, so that a user never notices the change. This is done at the beginning while opening the document.

Office automation APIs is another approach once the document is opened.

There are mechanisms to do layout/monitor management during roaming/casting scenarios. In roaming/casting scenarios, the workspace app 70 remembers or stores the monitor/layout configuration for the application. For example, virtual non-browser and native apps may be used. In addition, for workspace hub (WSH) casting, it remembers the WSH ID, make and/or monitor layout configuration details. Then workspace app/workspace hub remembers the preference and applies it in future casing sessions. So when a user goes back to the same conference room, the WSH ID may be matched and user preferences are used to move the windows or launch the new windows based on the user preference/pattern. If a user moves to a new conference room, the WSH ID may not be the same but the number of monitors/display configuration might be same. So, this info that was previously stored would be used.

There are mechanisms to do an automatic virtual monitor across physical monitors for applications based on content/context. As an example, a long Excel document may have a large number of rows. Depending on the monitor setup, the document would be launched on a particular monitor suited for the large number of rows.

Figure 23:
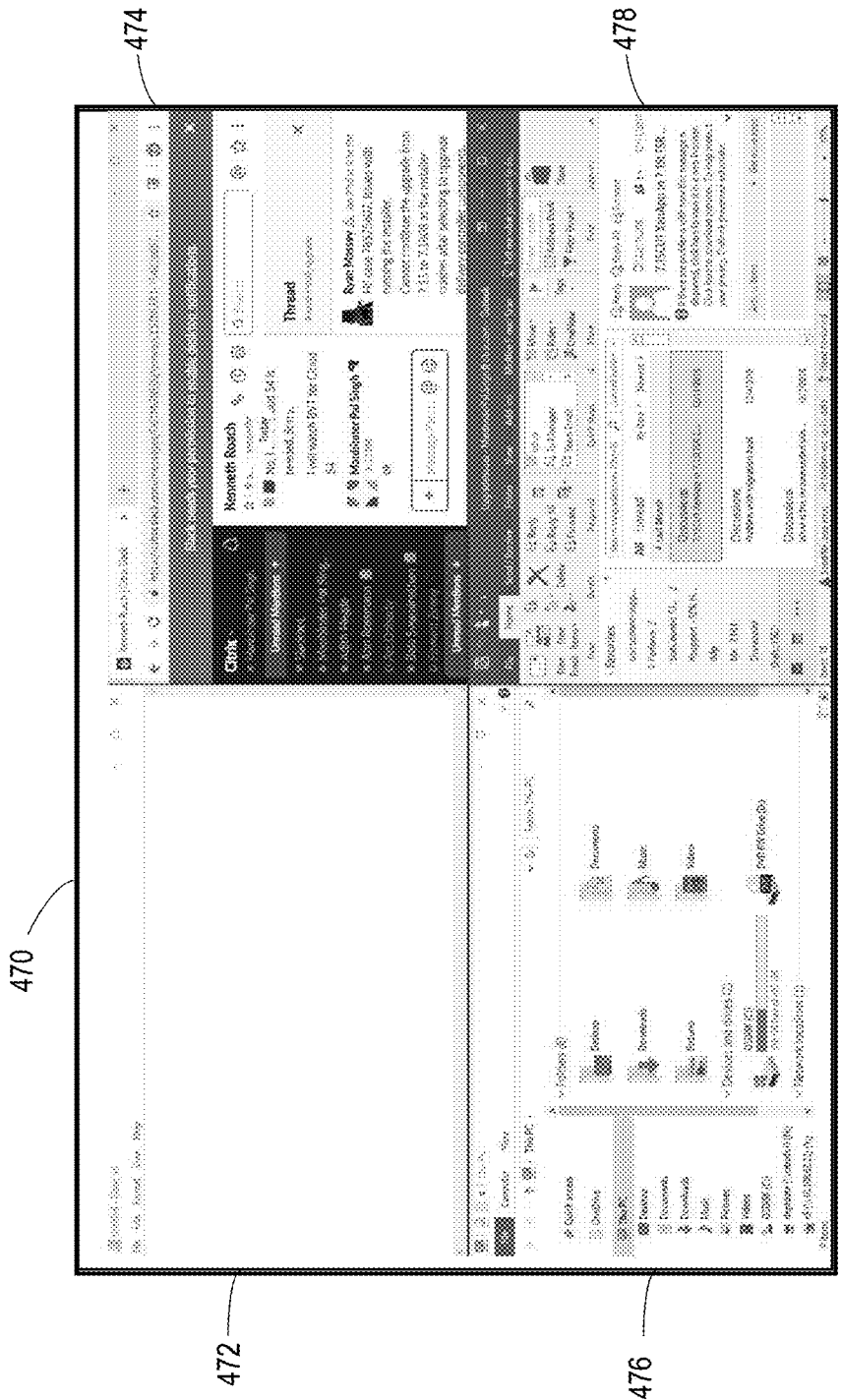
FIG. 23 is a screenshot illustrating application windows having equal sizes on a shared screen.

However, if the user has monitor setup with four monitors, for example, with the monitors numbered in a clockwise direction from top left. As illustrated in FIG. 23, notepad is on monitor 1 230(1), email is on monitor 2 230(2), Excel is on monitor 3 230(3), and Explorer is on monitor 4 230(4). Now, if Excel is launched and the document has lots of rows it will be given a virtual monitor layout spanning either across physical monitors 1 and 4 or a vertical monitor spanning across physical monitors 2 and 3.

Various factors are used to determine where and when an Excel document should be automatically launched using a virtual monitor/vertical layout.

Based on current availability of the monitors, for example, monitors 1 and 4 are empty and do not have applications. The Excel document can be launched right away in the virtual monitor mode occupying physical monitors 1 and 4.

Based on current usage, for example, a user is interacting with applications on physical monitors 2 and 3, and the least user interacted application is on monitor 1 and/or 4. In this case, the automatic virtual monitor management may be used.

Based on content, for example, a user might be watching video on monitor 1 and might not be interacting with the video. In this case, the Excel document is not launched in the vertical mode automatically.

Based on intent, for example, the horizontal/vertical scrollbar usage within the application is tracked. If a lot of use over a period of time is detected, and along with an understanding that a lot more rows still need to be looked/scrolled down, a recommendation is made to use the vertical monitor management.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computer system comprising:
   a client device configured to remotely access a virtual desktop, and configured to perform the following:
   launch a plurality of application windows on at least one display based on default launch positions,
   monitor usage of applications within the application windows to identify user patterns on how the applications are used in various layouts on the at least one display, with the various layouts corresponding to preferred user selected positions,
   map usage of the applications within the application windows, with the mapping including associating the preferred user selected positions to the corresponding default launch positions,
   display a recommendation notification on the at least one display notifying the user that a recommended position for at least one of the application windows is available, with the recommended position corresponding to the preferred user selected position for the at least one application window, and
   reposition the at least one application window to the preferred user selected position based on the mapping in response to the at least one application window not being in the preferred user selected position.

2. The computer system according to claim 1 wherein said client device is further configured to update the default launch positions to the preferred positions, and if the default launch position for one of the application windows is not updated to the preferred position, then a next time the application window is launched the preferred position will be used.

3. The computer system according to claim 1 wherein said client device is further configured to generate a transparent overlay on the at least one display representing where the application window is to be repositioned in response to the user selecting the recommendation notification.

4. The computer system according to claim 3 wherein said client device is further configured to reposition the application window in the preferred position in response to the user accepting the recommendation.

5. The computer system according to claim 1 wherein the at least one display comprises a single monitor configured to display the plurality of application windows.

6. The computer system according to claim 1 wherein the at least one display comprises a plurality of monitors, with each monitor having at least one application window displayed thereon.

7. The computer system according to claim 1 wherein at least one of the application windows has more than one preferred position associated therewith within a same session based on usage of the application within the at least one application window.

8. The computer system according to claim 7 wherein said client device is further configured to monitor content of different documents opened within the application, with the different documents being used in different layouts on the at least one display based on the content associated with each respective document, and with each layout corresponding to a preferred position.

9. The computer system according to claim 7 wherein said client device is further configured to monitor context of different documents opened within the application, with the different documents being used in different layouts on the at least one display based on the context associated with each respective document, and with each layout corresponding to a preferred position.

10. The computer system according to claim 1 wherein identifying user patterns further includes determining applications that are used together where a user switches back and forth between the applications, and if the application windows associated with the applications that are used together are spaced apart so that they are not side-by-side, then said client device is further configured to reposition at least one of the application windows so that the applications windows are side-by-side.

11. The computer system according to claim 1 wherein said client device is further configured to perform the following:
    launch at least one browser window on the at least one display, with the at least one browser window including a plurality of open web pages based on default launch positions;
    monitor usage of the open web pages within the at least one browser window to identify user patterns on how the open web pages are used in various layouts on the at least one display, with the various layouts corresponding to preferred positions;
    map usage of the open web pages within the at least one browser window, with the mapping including associating the preferred positions to the corresponding default launch positions; and
    reposition at least one of the open web pages to the preferred position associated therewith based on the mapping in response to the at least one open web page not being in the preferred position.

12. The computer system according to claim 11 wherein the mapping further includes associating respective web addresses to the preferred positions of the open web pages, with each respective web address having a categorization associated therewith.

13. The computer system according to claim 1 wherein monitoring usage of the applications within the application windows includes determining user interaction times with the respective applications, and wherein said client device is further configured to prioritize repositioning of the application windows on the at least one display based on the user interaction times.

14. The computer system according to claim 1 wherein said client device is further configured to perform the following:
    monitor how the application windows are currently positioned on the at least one display;
    cast the at least one display to an external display;
    monitor and map how the application windows are repositioned on the external display during the casting; and
    switch back to how the application windows were currently positioned on the at least one display in response to the casting being stopped, and a next time the at least one display is cast to the external display, reposition the application windows based on the mapping performed during the casting.

15. The computer system according to claim 1 wherein said client device is associated with a first workstation, and in response to the user of said client device roaming to a second workstation with a different display setup, the following is performed:
    monitor how the application windows are currently positioned on the at least one display for the first workstation;
    monitor and map how the application windows are repositioned on the different display setup during the roaming to the second workstation; and
    switch back to how the application windows were currently positioned on the at least one display in response to the user roaming back to the first workstation, and a next time the user roams back to the second workstation, reposition the application windows based on the mapping performed during the roaming to the second workstation.

16. The computer system according to claim 1 wherein at least one of the application windows has a first size when not being actively used, and a second window size when being actively used, with the second window size being different than the first window size; and wherein said client device is further configured to perform the following:
    monitor activity of the at least one application window; and
    adjust the at least one application window between the first and second window sizes based on the monitored activity.

17. The computer system according to claim 16 wherein the at least one application window is adjacent at least one other application window on the at least one display, and wherein said client device is further configured to adjust a size of the at least one other application window to accommodate the first and second sizes of the at least one application window.

18. The computer system according to claim 1 wherein the at least one display comprises a plurality of physical monitors, with each physical monitor having at least one application window displayed thereon; and wherein said client device is further configured to perform the following:
    monitor at least one of content and context of a document opened within one of the applications, with the document requiring a larger display area based on at least one of predetermined content and predetermined context; and
    create a virtual monitor to include at least two of the physical monitors to provide the larger display area for the document being monitored.

19. A method comprising:
    remotely accessing a virtual desktop;
    launching a plurality of application windows on at least one display based on default launch positions;
    monitoring usage of applications within the application windows to identify user patterns on how the applications are used in various layouts on the at least one display, with the various layouts corresponding to preferred user selected positions;

mapping usage of the applications within the application windows, with the mapping including associating the preferred user selected positions to the corresponding default launch positions;

displaying a recommendation notification on the at least one display notifying the user that a recommended position for at least one of the application windows is available, with the recommended position corresponding to the preferred user selected position for the at least one application window, and repositioning the at least one application window to the preferred user selected position based on the mapping in response to the at least one application window not being in the preferred user selected position.

20. The method according to claim 19 further comprising updating the default launch positions to the preferred positions, and if the default launch position for one of the application windows is not updated to the preferred position, then a next time the application window is launched the preferred position will be used.

21. The method according to claim 20 wherein further comprising:

generating a transparent overlay on the at least one display representing where the application window is to be repositioned in response to the user selecting the recommendation notification; and repositioning the application window in the preferred position in response to the user accepting the recommendation.

22. The method according to claim 19 wherein the at least one display comprises a single monitor configured to display the plurality of application windows.

23. The method according to claim 19 wherein the at least one display comprises a plurality of monitors, with each monitor having at least one application window displayed thereon.

24. The method according to claim 19 wherein at least one of the application windows has more than one preferred position associated therewith within a same session based on usage of the application within the at least one application window.

25. The method according to claim 24 wherein further comprising monitoring at least one of content and context of different documents opened within the application, with the different documents being used in different layouts on the at least one display based on at least one of the content and context associated with each respective document, and with each layout corresponding to a preferred position.

26. The method according to claim 19 wherein identifying user patterns further includes determining applications that are used together where a user switches back and forth between the applications, and if the application windows associated with the applications that are used together are spaced apart so that they are not side-by-side, then further comprising repositioning at least one of the application windows so that the applications windows are side-by-side.

27. The method according to claim 19 further comprising:

launching at least one browser window on the at least one display, with the at least one browser window including a plurality of open web pages based on default launch positions;

monitoring usage of the open web pages within the at least one browser window to identify user patterns on how the open web pages are used in various layouts on the at least one display, with the various layouts corresponding to preferred positions;

mapping usage of the open web pages within the at least one browser window, with the mapping including associating the preferred positions to the corresponding default launch positions; and repositioning at least one of the open web pages to the preferred position associated therewith based on the mapping in response to the at least one open web page not being in the preferred position.

28. The method according to claim 27 wherein the mapping further includes associating respective web addresses to the preferred positions of the open web pages, with each respective web address having a categorization associated therewith.

* * * * *